United States Patent
Sakuma et al.

(10) Patent No.: US 8,187,347 B2
(45) Date of Patent: May 29, 2012

(54) METHOD FOR PRODUCING COMPOSITION USING ALCOHOL AS STARTING MATERIAL

(75) Inventors: Shuji Sakuma, Tokyo (JP); Takashi Tsuchida, Tokyo (JP); Tetsuya Yoshioka, Tokyo (JP)

(73) Assignee: Kabushiki Kaisha Sangi, Tokyo (JP)

( * ) Notice: Subject to any disclaimer, the term of this patent is extended or adjusted under 35 U.S.C. 154(b) by 771 days.

(21) Appl. No.: 12/246,386

(22) Filed: Oct. 6, 2008

(65) Prior Publication Data

US 2010/0275509 A1 Nov. 4, 2010

Related U.S. Application Data

(63) Continuation-in-part of application No. PCT/JP2008/002547, filed on Sep. 16, 2008.

(30) Foreign Application Priority Data

Sep. 13, 2007 (JP) ................................ 2007-238140

(51) Int. Cl.
C10L 1/18 (2006.01)

(52) U.S. Cl. ........ 44/451; 568/902; 568/902.2; 585/733

(58) Field of Classification Search .................... 44/438, 44/451; 568/902, 902.2; 585/733
See application file for complete search history.

(56) References Cited

U.S. PATENT DOCUMENTS

| | | | |
|---|---|---|---|
| 2,050,788 A | 8/1936 | Fuchs et al. | |
| 2,175,359 A * | 10/1939 | Ocon | 585/310 |
| 2,971,033 A | 2/1961 | Farrar | |
| 3,972,952 A | 8/1976 | Clark | |
| 4,304,951 A | 12/1981 | Garwood et al. | |
| 4,981,491 A | 1/1991 | Harandi et al. | |
| 5,300,695 A | 4/1994 | Radlowski | |
| 6,323,383 B1 * | 11/2001 | Tsuchida et al. | 585/601 |
| 6,858,048 B1 | 2/2005 | Jimeson et al. | |
| 2007/0255079 A1 | 11/2007 | Tsuchida et al. | |

(Continued)

FOREIGN PATENT DOCUMENTS

EP 1 052 234 A1 11/2000

(Continued)

OTHER PUBLICATIONS

Ancillotti, F. et al. (Aug. 1, 1998). "Oxygenate Fuels: Market Expansion and Catalytic Aspect of Synthesis," Fuel Processing Technology 57:163-194.

(Continued)

*Primary Examiner* — Cephia D Toomer
(74) *Attorney, Agent, or Firm* — Hodgson Russ LLP

(57) ABSTRACT

The present invention is to provide compositions comprising organic compounds useful as a chemical industrial material or a fuel composition with the use of an alcohol such as ethanol as a material. It is a method for producing compositions using alcohol as a starting material and comprising: allowing alcohol to contact with an alcohol conversion catalyst such as hydroxyapatite (first step) and conducting a hydrogenation reaction respectively for all reaction products consisting of a liquid phase including alcohols, water and hydrocarbons of 4-12 carbons and a gas phase which is light gas containing paraffins, alcohols and olefins; all liquid phase reaction products consisting of all reaction products from which light gas has been removed; a liquid phase dehydration reaction products consisting of all reaction products from which light gas, unreacted alcohol and product water have been removed; and light gas (second step).

38 Claims, 1 Drawing Sheet

U.S. PATENT DOCUMENTS

| | | |
|---|---|---|
| 2009/0056204 A1 | 3/2009 | Tsuchida et al. |
| 2009/0205246 A1 | 8/2009 | Tsuchida et al. |

FOREIGN PATENT DOCUMENTS

| | | |
|---|---|---|
| JP | 57-102822 A | 6/1982 |
| JP | 58-59928 A | 4/1983 |
| JP | 58083635 A | 5/1983 |
| JP | 58154517 A | 9/1983 |
| JP | 01223195 A | 9/1989 |
| JP | 5-305238 A | 11/1993 |
| JP | 2000086245 A | 3/2000 |
| JP | 2002274852 A | 9/2002 |
| JP | 2006198503 A | 8/2006 |
| JP | 2008088140 A | 4/2008 |
| WO | WO-99/38822 A | 8/1999 |
| WO | WO-2006/059729 A1 | 6/2006 |
| WO | WO-2009/028166 A1 | 3/2009 |
| WO | WO-2009/034719 A1 | 3/2009 |

OTHER PUBLICATIONS

Anonymous. (Dec. 20, 2001). "Gasoline Blending Streams Test Plan," Submitted to the US EPA by the American Petroleum Institute Petroleum HPV Testing Group, pp. 1-38.

Anonymous. (May 2005). "Motor Fuels Understanding the Factors that Influence the Retail Price of Gasoline," *United States Government Accountability Office*, GAO-05-525SP, pp. 1-60.

Baker, B.G. et al. (1988). "Synthesis Gas to Motor Fuel via Light Alkenes," in *Methane Conversion*, Bibby, D.M. et al. eds., Elsevier Science Publishers B.V., Amsterdam, pp. 497-.

Bhattacharyya, S.K. et al. (Mar. 12, 1962). "One-Step Catalytic Conversion of Ethanol to Butadiene in the Fixed Bed I. Single-Oxide Catalysis," *J. Appl. Chem*. pp. 97-104.

Bhattacharyya, S.K. et al. (Mar. 12, 1962). "One-Step Catalytic Conversion of Ethanol to Butadiene in the Fixed Bed II. Binary and Ternary-Oxide Catalysis," *J. Appl. Chem*. pp. 105-110.

Burk, P.L. et al. (1985). "The Rhodium-Promoted Guerbet Reaction Part 1. Higher Alcohols from Lower Alcohols," *J. of Molecular Catalysis* 33:1-14.

Corson, B.B. et al. (Feb. 1950). "Butadiene from Ethyl Alcohol Catalysis in the One-and Two-Step Processes," *Industrial and Engineering Chemistry* 42(2):359-373.

Demirbas, A. (2007, e-pub. Aug. 22, 2006). "Progress and Recent Trends in Biofuels," *Progress in Energy and Combustion Science* 33:1-18.

Hamelinck, C.N. et al. (2006, e-pub. Aug. 8, 2005). "Outlook for Advanced Biofuels," *Energy Policy* 34:3268-3283.

Knothe, G. (Sep. 2002). "Synthesis, Applications, and Characterization of Guerbet Compounds and Their Derivatives," *Lipid Technology* pp. 101-104.

Maiden, C.J. et al. (1988). "The New Zealand Gas-to-Gasoline Project," in *Methane Conversion*, Bibby, D.M. et al. eds., Elsevier Science Publishers B.V., Amsterdam, pp. 1-16.

Malça, J. et al. (Mar. 13, 2006). "Renewability and Life-Cycle Energy Efficiency of Bioethanol and Bio-Ethyl Tertiary Butyl Ether (bioETBE): Assessing the Implications of Allocation," *Energy* 31:3362-3380.

Meisel, S.L. et al. (Feb. 1976). "Gasoline from Methanol in One Step," *Chemtech*. pp. 86-89.

Mysov, V.M. et al. (2005). "Synthesis Gas Conversion Into Hydrocarbons (Gasoline Range) Over Bifunctional Zeolite-Containing Catalyst: Experimental Study and Mathematical Modelling," *Chemical Engineering Journal* 107:63-71.

Nagarajan, V. (Oct. 1971). "Kinetics of a Complex Reaction System-Preparation of n-Butanol from Ethanol in One Step," *Indian Journal of Technology* 9:380-386.

Ndou, A.S. et al. (2003). "Dimerisation of Ethanol to Butanol Over Solid-Base Catalysts," *Applied Catalysis A: General* 251:337-345.

Olson, E.S. et al. (2004). "Higher-Alcohols Biorefinery Improvement of Catalyst for Ethanol Conversion," *Applied Biochemistry and Biotechnology* 113-116:913-932.

Snelling, J. et al. (Jan. 21, 2003). "Synthesis of Higher Carbon Ethers from Olefins and Alcohols I. Reactions with Methanol," *Fuel Processing Technology* 83:219-234.

Ueda, W. et al. (1990). "A Low-Pressure Guerbet Reaction over Magnesium Oxide Catalyst," *J. Chem. Soc., Chem. Commun*. pp. 1558-1559.

Ueda, W. et al. (1992). "Condensation of Alcohol over Solid-Base Catalyst to Form Higher Alcohols," *Catal. Letters* 12:97-104.

Yang, C. et al. (1993). "Bimolecular Condensation of Ethanol to 1-Butanol Catalyzed by Alkali Cation Zeolites," *Journal of Catalysis* 142:37-44.

Pereira et al.; Effect of mono-olefins and diolefins on the stability of automotive gasoline; Fuel, 2006, vol. 85; pp. 1860-1865.

MacDougall; Methanol to Fuels Routes—The Achievements and Remaining Problems; Catalysis Today, 1991, vol. 8; pp. 337-369.

\* cited by examiner

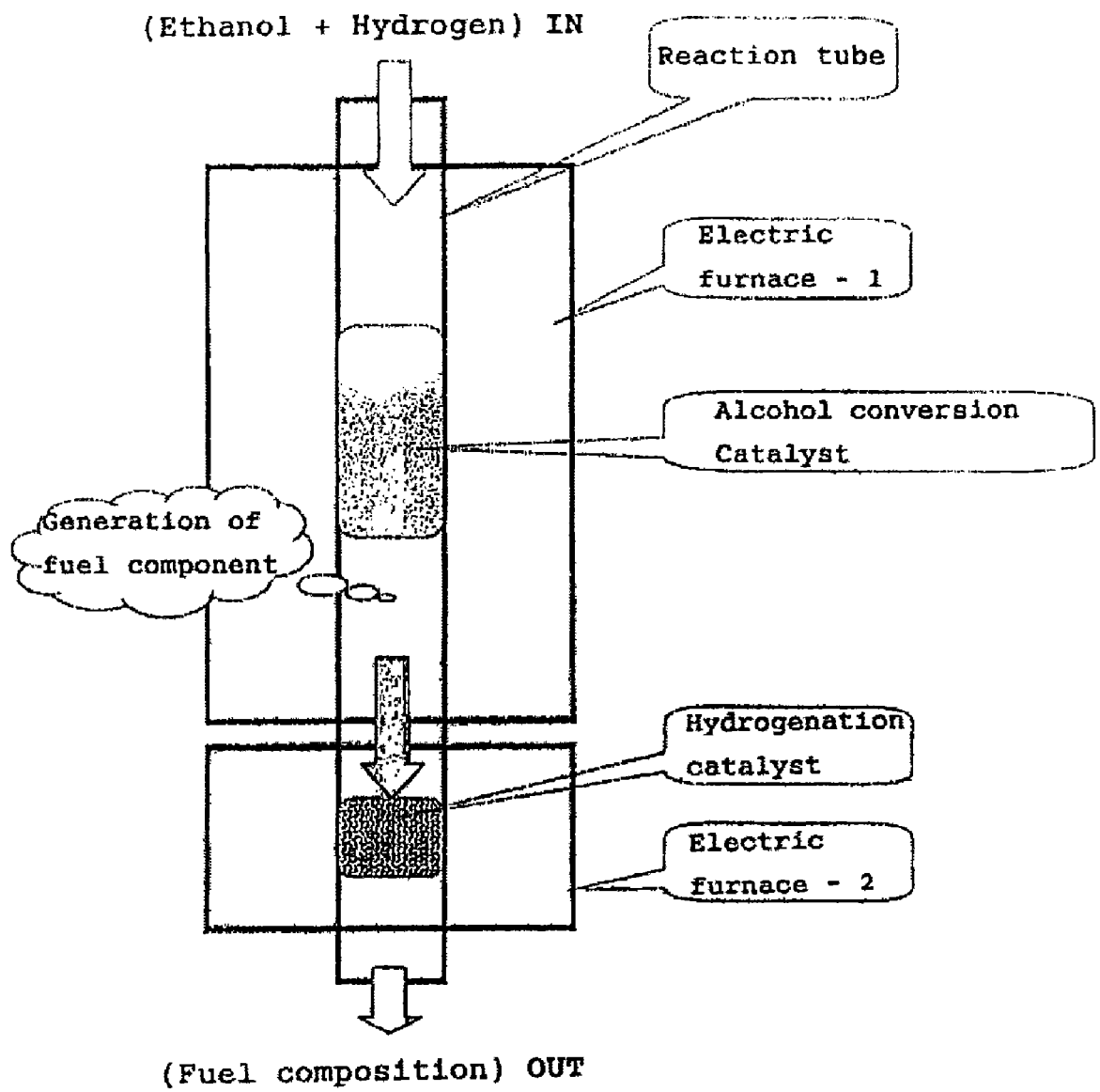

METHOD FOR PRODUCING COMPOSITION USING ALCOHOL AS STARTING MATERIAL

CROSS-REFERENCE TO RELATED APPLICATIONS

This application is a continuation-in-part of PCT Application No. PCT/JP2008/002547, filed Sep. 16, 2008, which claims the benefit of Japanese Patent Application No. 2007-238140, Sep. 13, 2007, the contents of which are incorporated herein by reference in their entirety.

TECHNICAL FIELD

The present invention relates to a method for producing compositions comprising organic compounds useful as a chemical industrial material or a fuel composition with the use of an alcohol such as ethanol as a starting material.

BACKGROUND OF THE INVENTION

Gasoline is a liquid oil fraction which is volatile at the boiling point range of about 30-200° C. From a constituent aspect, gasoline is a mixture of hydrocarbons of 4-12 carbons (see nonpatent document 1). The United States which is the world's largest consumer of gasoline consumed about 380 million gallon/day in 2004 and its consumption amounts to 40% or more in the world's gasoline consumption (see nonpatent document 2). Other than in the United States, gasoline has a significantly large influence on the economy and energy strategy of each country. Gasoline is currently synthesized from oil and the future oil-depletion problem (energy security) is of a great concern. Further, prevalence of cars, a representation of civilization, is considered to be the major cause of global warming due to carbon-dioxide emissions as a result of mass consumption of fossil fuels, and it is required to reduce carbon-dioxide emissions. In order to cope with this situation, car manufacturers have been developing hybrid cars, FFV, fuel-cell cars, electric cars, etc., among which hybrid cars and FFV are already penetrated the market in spite of their rather high prices.

On the other hand, a technique of synthesizing gasoline from methanol using a zeolite catalyst developed by Mobil Corporation (MTG), a technique of synthesizing liquid fuels from synthetic gas (GTL) and the like are known as synthetic techniques for new type of fuels (see nonpatent documents 3-5). Methanol, a material of MTG, is currently synthesized mainly from natural gas, i.e. fossil resources. Synthetic gas as a material of GTL is obtained from natural gas and biomass, but a liquefied fuel is an alternative fuel for light oil and cannot be directly used for gasoline-powered cars.

Gas engine, 4-stroke engine, diesel engine, jet engine and so on are well known as an internal combustion engine, i.e., a machine to retrieve energy. The current situation and problematic issues are as follows. Ethanol, butanol, Methyl tert-butyl ether (MTBE), and Ethyl tert-butyl ether (ETBE) are known as gasoline additives in a 4-stroke engine (see nonpatent documents 6-10). When ethanol is added to gasoline, existing gasoline-powered cars are said to be free of influence when the amount of ethanol added is up to about 10%. Hence, gasoline containing 10% ethanol is sold as gasohol (E10) in the United States. In Brazil, commonly used gasoline already contains ethanol by 22-26%. Gasoline containing ethanol by 85% (E85) and fuels of 100% ethanol require specialized cars. Ethanol, however, has a lower calorific value compared to gasoline and it has been reported that fuel consumption of E10 and E85 is poorer than that of gasoline. Further, mixing of water causes fuel layers to separate in an ethanol-mixed gasoline, which is said to be a cause of the engine trouble. MTBE had been used worldwide in 1980's as a means of NOx control in the exhaust gas and as an octane booster which was a substitute for conventional tetraethyllead. MTBE, however, has been revealed in the United States to be a substance that pollutes groundwater and more and more states have come to prohibit the use of MTBE. Presumably, MTBE will be totally prohibited in the near future. ETBE is synthesized from ethanol and isobutylene and is currently prevailing mainly in Europe in both aspects of as a MTBE substitute and as a plant-origin fuel additive. However, isobutylene, one of the materials of ETBE, is derived from oil so that it is inadequate as a global warming countermeasures and the problems of ecological safety and production cost remains.

It is expected that the production volume of these new type cars and new fuels will increase in the future. On the other hand, the currently existing gasoline-powered cars will certainly remain in the market in the next 20 years or so. Accordingly, substitute fuels that match these existing gasoline-powered cars are desired to be developed.

On the other hand, a method using a hydroxyapatite catalyst, wherein the solid acid and basicity on the catalyst surface are controlled, is proposed as a method for synthesizing a high-octane fuel using ethanol as a material (see patent document 1). In this method, however, the molar ratio of phosphorus and calcium in the catalyst needs to be carefully adjusted. Hence, there was a problem of difficulty in preparing the catalyst. In addition, the produced fuel is poor in oxidative stability and forms a lot of gum.

[Patent document 1] WO99/38822
[Nonpatent document 1] Gasoline Blending Streams Test Plan, Submitted to the US EPA by The American Petroleum Institute Petroleum HPV Testing Group, AR201-13409A, 2001.
[Nonpatent document 2] Motor Fuels Understanding the Factors That Influence the Retail Price of Gasoline, the United States Government Accountability Office, GAO-05-525SP, May 2005.
[Nonpatent document 3] Meisel, L. S., McCullough, P. J., Lechthaler, H. C. and Weisz, B. P. Gasoline from methanol in one step. Chemtech 1976, February, 86-89.
[Nonpatent document 4] Maiden, J. C., The New Zealand Gas-to-Gasoline Project, Methane Conversion, Elsevier Science Publishers B. V., Amsterdam 1988, 1-16.
[Nonpatent document 5] Baker, G. B. and Clark, J. N. Synthesis Gas to Motor Fuel via Light Alkenes, Methane Conversion, Elsevier Science Publishers B. V., Amsterdam 1988, 497-501.
[Nonpatent document 6] Demirbas, A. Progress and recent trends in biofuels. Progress in Energy and Combustion Science, 2007, 33, 1-18.
[Nonpatent document 7] Ancillotti, F. and Fattore, V. Oxygenate fuels: Market expansion and catalytic aspect of synthesis. Fuel Processing Technology, 1998, 57, 163-194.
[Nonpatent document 8] Malca, J. and Freire, F. Renewability and life-cycle energy efficiency of bioethanol and bio-ethyl tertiary butyl ether (bioETBE): Assessing the implications of allocation. Energy, 2006, 31, 3362-3380.
[Nonpatent document 9] Snelling, J., Curtis, W. C. and Park, Y-K. Synthesis of higher carbon ethers from olefins and alcohols. I. Reactions with methanol. Fuel Processing Technology, 2003, 83, 219-234.
[Nonpatent document 10] Hamelinck, N. C., Faaij, P. C. A., Outlook for advanced biofuels. Energy Policy, 2006, 34, 3268-3283.

All patents, patent applications, documents, and articles cited herein are herein incorporated by reference in their entirety.

BRIEF SUMMARY OF THE INVENTION

In one aspect of the invention is a method for producing a composition using an alcohol as a starting material, the composition comprising at least one component selected from the group consisting of paraffins and alcohols, wherein the method comprises a first step to allow alcohol to contact with an alcohol conversion catalyst and a second step to subject the product obtained in the first step to a hydrogenation reaction. In some embodiments, the starting material is ethanol. In some embodiments, the alcohol conversion catalyst concurrently causes dehydration and dehydrogenation of alcohol. In some embodiments, the alcohol conversion catalyst is calcium phosphate. In some embodiments, the calcium phosphate is hydroxyapatite. In some embodiments, the alcohol conversion catalyst is a clay mineral. In some embodiments, the clay mineral is hydrotalcite. In some embodiments, the first step reaction is conducted at 1-200 atm. In some embodiments, the first step reaction is conducted at 100-600° C. In some embodiments, the first step reaction is conducted for 0.1-600 seconds. In some embodiments, hydrogen is used as a carrier gas for the starting material alcohol in the first step reaction. In some embodiments, the conversion rate of alcohol in the first step is 0.3% to 100%. In some embodiments, the following is used as a product in the first step: all reaction products consisting of a liquid phase including alcohols, water and hydrocarbons of 4-12 carbons and a gas phase which is light gas containing paraffins, alcohols and olefins. In some embodiments, the following is used as a product in the first step: all liquid phase reaction products consisting of all reaction products from which light gas has been removed. In some embodiments, one of the following is used as a product in the first step: a liquid phase dehydration reaction products consisting of all reaction products from which light gas, unreacted ethanol and product water have been removed. In some embodiments, the following is used as a product in the first step: light gas. In some embodiments, all reaction products in the first step respectively comprise paraffins at 0-1.7 wt %, olefins at 0-60.3 wt %, dienes at 0-19.8 wt %, aromatics at 0-11.4 wt %, alcohols at 0-37.4 wt %, aldehydes at 0-5.4 wt %, ethers at 0-2.2 wt %, and product water at 0.1-38.8 wt % relative to the starting material ethanol. In some embodiments, the alcohols in the liquid phase converted from ethanol in the first step comprise at least one of butanol, hexanol and octanol. In some embodiments, a hydrogenation catalyst is used in the hydrogenation reaction step. In some embodiments, the second step reaction is conducted at 1-200 atm. In some embodiments, the second step reaction is conducted at 0-400° C. In some embodiments, the second step is a step conducting a hydrogenation reaction of the following: all reaction products in the first step. In some embodiments, the second step is a step conducting a hydrogenation reaction of the following: all liquid phase reaction products consisting of all reaction products in the first step from which light gas has been removed. In some embodiments, the second step is a step conducting a hydrogenation reaction of the following: liquid phase dehydration reaction products consisting of all reaction products in the first step from which light gas, unreacted ethanol and product water have been removed. In some embodiments, the second step is a step conducting a hydrogenation reaction of the following: light gas. In some embodiments, hydrogen is used as a carrier gas for the starting material alcohol in the first step, and the hydrogen as a carrier gas is used in the hydrogenation reaction in the second step. In some embodiments, hydrogen generated in the first step is used in the hydrogenation reaction in the second step.

In another aspect of the invention is a composition obtained by a production method as described herein. In some embodiments, the hydrogenation reaction is conducted for all reaction products in the first step. In some embodiments, the composition contains paraffins at 0.5-64.0 wt %, olefins at 0-6.3 wt %, dienes at 0-2.1 wt % and aldehydes at 0.1-0.4 wt % relative to the starting material ethanol. In some embodiments, the composition contains C1 paraffins at 0.1-2.5 wt %, C2 paraffins at 0.2-62.2 wt %, C4 paraffins at 0.1-7.6 wt %, C6 paraffins at 0-10.3 wt % and C8 paraffins at 0-4.5 wt % relative to the starting material ethanol. In some embodiments, the hydrogenation reaction is conducted for all liquid phase reaction products consisting of all reaction products from which light gas has been removed in the first step. In some embodiments, the composition contains paraffins at 0.3-28.9 wt %, olefins at 0-1.6 wt %, dienes at 0-0.7 wt % and aldehydes at 0.1-0.2 wt % relative to the starting material ethanol. In some embodiments, the composition contains C1 paraffins at 0-1.9 wt %, C2 paraffins at 0.1-2.2 wt %, C4 paraffins at 0.1-2.4 wt %, C6 paraffins at 0-12.2 wt % and C8 paraffins at 0-5.5 wt % relative to the starting material ethanol. In some embodiments, the hydrogenation reaction is conducted for liquid phase dehydration reaction products consisting of all reaction products from which light gas, unreacted ethanol and product water have been removed in the first step. In some embodiments, the composition contains paraffins at 0.2-29.2 wt %, olefins at 0-1.3 wt %, dienes at 0-0.4 wt % and aldehydes at 0-0.1 wt % relative to the starting material ethanol. In some embodiments, the composition contains C1 paraffins at 0.1-1.3 wt %, C2 paraffins at 0.1-1.4 wt %, C4 paraffins at 0-1.9 wt %, C6 parffins at 0-13.3 wt % and C8 paraffins at 0-6.5 wt % relative to the starting material ethanol. In some embodiments, the hydrogenation reaction is conducted for light gas in the first step. In some embodiments, the composition contains paraffins at 1.2-64.2 wt %, olefins at 0-0.5 wt %, and dienes at 0-0.5 wt % relative to the starting material ethanol. In some embodiments, the composition contains C1 paraffin at 0-0.3 wt %, C2 paraffin at 0.4-64.2 wt %, and C4 paraffin at 0-7.7 wt % relative to the starting material ethanol. In some embodiments, the composition contains olefins at 0-10.0 wt % relative to the starting material ethanol. In some embodiments, the composition contains dienes at 0-3.0 wt % relative to the starting material ethanol. In some embodiments, the composition contains aldehydes at 0-1.0 wt % relative to the starting material ethanol. In some embodiments, the composition contains paraffins at 0.2-70.0 wt % relative to the starting material ethanol. In some embodiments, the composition contains alcohols at 0-50.0 wt % relative to the starting material ethanol.

In another aspect of the invention is a fuel composition as described herein. In some embodiments, the fuel composition is useful for an internal combustion engine. In some embodiments, the fuel composition has improved fuel oxidation stability. In some embodiments, the fuel composition olefin and diene contents are decreased and the paraffin content is increased. In some embodiments, the fuel composition aldehyde content is decreased and the alcohol content is increased. In some embodiments, the fuel composition gum content is lower than the level of JIS standard due to a hydrogenation reaction in the second step.

In any of the embodiments described herein, all numbers expressing reaction conditions, stoichiometries, concentrations of components, and so forth used in the specification and claims may in some embodiments be modified by the term "about." Accordingly, the numerical parameters set forth in the following specification and attached claims are in some embodiments approximations that may vary depending at least upon the specific analytical technique.

BRIEF DESCRIPTION OF THE DRAWINGS

FIG. 1 is a schematic view explaining a device for use in the method for producing organic compounds of the present invention.

DETAILED DESCRIPTION OF THE INVENTION

The object of the present invention is to provide a method for producing compositions comprising paraffins and alcohols useful as a chemical industrial material or a fuel composition with the use of alcohol as a material.

Because bioethanol is plant-derived, there is no need to worry about depletion by producing it in a planned manner. Also, the plant-derived energy sources are deemed as carbon-neutral as accepted in COP-3 Kyoto Protocol (1997) so that it does not constitute new carbon-dioxide emissions. The worldwide production volume of ethanol in 2006 was 51 million kl, which is an increase by 11% from the production volume of the previous year. The United States, Brazil, China, India are, in this order, the world's biggest ethanol producers, and other countries follow after these countries. In Brazil which is a country where ethanol business is the most prevalent in the world, the production cost of ethanol is already far below the international oil price due to their completed infrastructure from sugarcane cultivation to ethanol distribution. In the United States, production volume of ethanol is rapidly increasing which is attributed to the state policy. In the State of the Union address delivered in January 2007 by President Bush, he urged to promote the development of new technology to produce ethanol from various agricultural and forestry cellulose residue including bagasse, rice straws, wheat straws, corn stems and leaves, refuse papers, waste materials, and kitchen wastes. It is thus thought that the ethanol yields per unit area will increase to more than double in the near future so that increase in the ethanol production volume and decrease in the production cost can be expected. Moreover, it is unlikely that production cost of ethanol will increase in the future.

Under these circumstances, the present inventors started to develop a substitute fuel which can be used for existing gasoline-powered cars. They first focused on using the plant-derived bioethanol as a material. Since ethanol has already been used as a gasoline additive, little or no further studies have been carried out on ethanol. In advancing the studies, the present inventors have found out that a fuel composition synthesized from an ethanol material has high diene and aldehyde contents, and that the diene and aldehyde contents cause a lower oxidative stability and gum formation in the fuel. The present inventors have also found out that a fuel which has a remarkably improved oxidative stability, a suppressed gum formation and a high calorific value can be produced when hydrogen is added after allowing ethanol to contact with an alcohol conversion catalyst. The present invention has thus been completed. It was further found out in the series of the development, that alcohol can be produced at a high yield by using this method. Further, the present inventors have found out that when a mixed alcohol is desired as a resultant composition obtained by a hydrogenation reaction, a low ethanol conversion rate is preferred, for example the ethanol conversion rate of 0.3-90 wt %, preferably 0.3-57.3 wt % is recommended. It has also been found out that when mixed paraffin is desired to be obtained in higher amount, the ethanol conversion rate of 50 wt % or more, preferably 82.6 wt % or more is recommended.

The present invention relates to (1) a method for producing a composition using an alcohol as a starting material, the composition comprising at least one component selected from the group consisting of paraffins and alcohols, wherein the method comprises a first step to allow alcohol to contact with an alcohol conversion catalyst and a second step to subject the product obtained in the first step to a hydrogenation reaction; (2) the method for producing a composition according to (1), wherein the starting material is ethanol; (3) the method for producing a composition according to (1) or (2), wherein the alcohol conversion catalyst concurrently causes dehydration and dehydrogenation of alcohol; (4) the method for producing a composition according to any one of (1) to (3), wherein the alcohol conversion catalyst is calcium phosphate; (5) the method for producing a composition according to (4), wherein calcium phosphate is hydroxyapatite; (6) the method for producing a composition according to any one of (1) to (3), wherein the alcohol conversion catalyst is a clay mineral; (7) the method for producing a composition according to (6), wherein the clay mineral is hydrotalcite; (8) the method for producing a composition according to any one of (1) to (7), wherein the first step reaction is conducted at 1-200 atm; (9) the method for producing a composition according to any one of (1) to (8), wherein the first step reaction is conducted at 100-600° C.; (10) the method for producing a composition according to any one of (1) to (9), wherein the first step reaction is conducted for 0.1-600 seconds; (11) the method for producing a composition according to any one of (1) to (10), wherein hydrogen is used as a carrier gas for the starting material alcohol in the first step reaction; (12) the method for producing a composition according to any one of (1) to (11), wherein a conversion rate of alcohol in the first step is 0.3% to 100%; (13) the method for producing a composition according to any one of (1) to (12), wherein one of the followings is used as a product in the first step: all reaction products consisting of a liquid phase including alcohols, water and hydrocarbons of 4-12 carbons and a gas phase which is light gas containing paraffins, alcohols and olefins; all liquid phase reaction products consisting of all reaction products from which light gas has been removed; a liquid phase dehydration reaction products consisting of all reaction products from which light gas, unreacted ethanol and product water have been removed; and light gas; (14) the method for producing a composition according to (13), wherein all reaction products in the first step respectively comprise paraffins at 0-1.7 wt %, olefins at 0-60.3 wt %, dienes at 0-19.8 wt %, aromatics at 0-11.4 wt %, alcohols at 0-37.4 wt %, aldehydes at 0-5.4 wt %, ethers at 0-2.2 wt %, and product water at 0.1-38.8 wt % relative to the starting material ethanol; (15) the method for producing a composition according (13) or (14), wherein alcohols in the liquid phase converted from ethanol in the first step comprise at least one of butanol, hexanol and octanol; (16) the method for producing a composition according to any one of (1) to (15), wherein a hydrogenation catalyst is used in the hydrogenation reaction step; (17) the method for producing a composition according to any one of (1) to (16), wherein the second step reaction is conducted at 1-200 atm; (18) the method for producing a composition according to any one of (1) to (17), wherein the second step reaction is conducted at 0-400° C.; (19) the method for producing a composition according to any one of (13) to (18), wherein the second step is a step conducting a hydrogenation reaction of one of the followings: all reaction products in the first step; all liquid phase reaction products consisting of all reaction products in the first step from which light gas has been removed; liquid phase dehydration reaction products consisting of all reaction products in the first step from which light gas, unreacted ethanol and product water have been removed; and light gas; (20) the method for producing a composition according to any one of (1) to (19), wherein hydrogen is used as a carrier gas for the starting material alcohol in the first step, and the hydrogen as a carrier gas is used in the hydrogenation reaction in the second step; and (21) the method for producing a composition according to any one of (1) to (20), wherein hydrogen generated in the first step is used in the hydrogenation reaction in the second step.

The present invention also relates to (22) a composition obtained by a production method wherein the hydrogenation reaction is conducted for all reaction products in the first step according to any one of (13) to (21); (23) the composition according to (22), containing paraffins at 0.5-64.0 wt %, olefins at 0-6.3 wt %, dienes at 0-2.1 wt % and aldehydes at 0.1-0.4 wt % relative to the starting material ethanol; (24) the composition according to (23), containing C1 paraffins at 0.1-2.5 wt %, C2 paraffins at 0.2-62.2 wt %, C4 paraffins at 0.1-7.6 wt %, C6 paraffins at 0-10.3 wt % and C8 paraffins at 0-4.5 wt % relative to the starting material ethanol; (25) a composition obtained by a production method wherein the hydrogenation reaction is conducted for all liquid phase reaction products consisting of all reaction products from which light gas has been removed in the first step according to any one of (13) to (21); (26) the composition according to (25), containing paraffins at 0.3-28.9 wt %, olefins at 0-1.6 wt %, dienes at 0-0.7 wt % and aldehydes at 0.1-0.2 wt % relative to the starting material ethanol; (27) the composition according to (26), containing C1 paraffins at 0-1.9 wt %, C2 paraffins at 0.1-2.2 wt %, C4 paraffins at 0.1-2.4 wt %, C6 paraffins at 0-12.2 wt % and C8 paraffins at 0-5.5 wt % relative to the starting material ethanol; (28) a composition obtained by a production method wherein the hydrogenation reaction is conducted for liquid phase dehydration reaction products consisting of all reaction products from which light gas, unreacted ethanol and product water have been removed in the first step according to any one of (13) to (21); (29) the composition according to (28), containing paraffins at 0.2-29.2 wt %, olefins at 0-1.3 wt %, dienes at 0-0.4 wt % and aldehydes at 0-0.1 wt % relative to the starting material ethanol; (30) the composition according to (29), containing C1 paraffins at 0.1-1.3 wt %, C2 paraffins at 0.1-1.4 wt %, C4 paraffins at 0-1.9 wt %, C6 parffins at 0-13.3 wt % and C8 paraffins at 0-6.5 wt % relative to the starting material ethanol; (31) a composition obtained by the production method in which a hydrogenation reaction is conducted for light gas in the first step according to any one of (13) to (21); (32) the composition according to (31), containing paraffins at 1.2-64.2 wt %, olefins at 0-0.5 wt %, and dienes at 0-0.5 wt % relative to the starting material ethanol; (33) the composition according to (32), containing C1 paraffin at 0-0.3 wt %, C2 paraffin at 0.4-64.2 wt %, and C4 paraffin at 0-7.7 wt % relative to the starting material ethanol; (34) the composition according to any one of (22) to (33), containing olefins at 0-10.0 wt % relative to the starting material ethanol; (35) the composition according to any one of (22) to (34), containing dienes at 0-3.0 wt % relative to the starting material ethanol; (36) the composition according to any one of (22) to (35), containing aldehydes at 0-1.0 wt % relative to the starting material ethanol; (37) the composition according to any one of (22) to (36), containing paraffins at 0.2-70.0 wt % relative to the starting material ethanol; and (38) the composition according to any one of (22) to (37) containing alcohols at 0-50.0 wt % relative to the starting material ethanol.

The present invention further relates to (39) a fuel composition for an internal combustion engine with improved fuel oxidation stability, comprising a composition according to any one of (22) to (38), wherein the olefin and diene contents are decreased and the paraffin content is increased; (40) a fuel composition for an internal combustion engine with improved fuel oxidation stability, comprising a composition according to (22) to (38), wherein the aldehyde content is decreased and the alcohol content is increased; and (41) a fuel composition for an internal combustion engine, comprising a composition according to any one of (22) to (38), wherein the gum content is lower than the level of JIS standard due to a hydrogenation reaction in the second step.

There is no particular limitation as a method for producing compositions of the present invention as long as it is a method for producing compositions using alcohol as a starting material which comprises a first step to allow alcohol to contact with an alcohol conversion catalyst and a second step to conduct a hydrogenation reaction on a product obtained in the first step, wherein the compositions comprise at least one component selected from the group consisting of paraffins and alcohols. Paraffins in the present invention means alkane (saturated chain hydrocarbons shown by the general formula of $C_nH_{2n+2}$).

The production method of the present invention gives high yields of paraffins and alcohols, which can respectively be used as a chemical industrial material and the like. A composition produced by the production method of the present invention is very useful as a fuel composition for an internal combustion engine, because, as stated above, such composition has high contents of paraffins and alcohols that are the most preferred for a fuel composition for an internal combustion engine and because it has almost no content of dienes, aldehydes, etc. that are unfavorable for a fuel composition for an internal combustion engine. It can thus be used as a gasoline fuel substitute or a gasoline additive. The fuel composition for an internal combustion engine has a remarkably improved oxidative stability, a suppressed gum formation and a high calorific value. Especially, the oxidative stability is far more superior to that of the JIS standard.

In general, when oil products are subjected to oxidation, the viscosity increases and color darkens. Further, primary quality requirements of oil products cannot be kept any longer due to the generation of precipitable polymers (sludge). Oxidation stability tests are for indicating the stability degree of oil products against oxidation. Oil products with poor oxidation stability are more likely to impair the product quality by being exposed to air for a long time than those with superior oxidation stability. An oxidation stability test method for automotive gasoline in Japan is stipulated in JIS K2287 "Test method for oxidation stability of gasoline (Induction period method)" and the standard level is "240 min or more".

Further, unwashed actual gum means evaporation residues of such as automotive gasoline, and the high gum content causes deposition in the induction system, fixation of the induction valve, and so on. A test method for actual gum is stipulated in JIS K2261 "Test method for Oil products—Automotive gasoline and Aircraft fuel oil—Actual gum (Jet evaporation method)" and the standard level of the unwashed actual gum is "20 mg/100 ml or less".

Alcohol as a starting material of the present invention may be a linear alcohol or a branched-chain alcohol and may be a saturated alcohol or an unsaturated alcohol. Also, the carbon numbers are not particularly limited, but alcohols with 1-22 carbons are preferred and alcohols with 1-8 carbons are more preferred from the standpoint of the ease in availability. Especially preferred examples include linear alcohols such as methanol, ethanol, 1-propanol, 1-butanol, 1-pentanol, 1-hexanol, 1-heptanol, 1-octanol, where ethanol is particularly preferred in view of the reactivity and the fact that it can be produced from plants. Alcohol as a starting material may be a single type of alcohols or may be two or more types of alcohols. When two or more types of alcohols are used, it is preferred to use ethanol as at least one type of alcohols.

As for an alcohol conversion catalyst used in the first step is not particularly limited as long as it is a catalyst which cause dehydration and dehydrogenation of alcohol at the same time and which can synthesize hydrocarbons such as olefins and dienes, and oxygenated compounds such as aldehydes and alcohols. Specific examples include calcium phosphate, kaolin clay minerals, pyrophyllite clay minerals, smectite clay minerals, hydrotalcite, calcium silicate, calcium fluoride, calcium sulfate, magnesium hydroxide, chitin, lithium phosphate, aluminum phosphate, magnesium phosphate, titanium oxide, calcium hydroxide, and sepiolite. These may be used in mixture.

Calcium phosphate used in the present invention includes hydroxyapatite $Ca_{10}(PO_4)_6(OH)_2$, tricalcium phosphate $Ca_3(PO_4)_2$, calcium monohydrogen phosphate $CaHPO_4.0\sim2H_2O$, calcium dihydrogen phosphate $Ca(H_2PO_4)_2.0\sim1H_2O$, calcium diphosphate $Ca_2P_2O_7$, calcium metaphosphate $Ca(PO_3)_2$, fluoride apatite $Ca_{10}(PO_4)_5F_2$, tetracalcium phosphate $Ca_4(PO_4)_2O$, octacalcium phosphate $Ca_8H_2(PO_4)_5.5H_2O$. Among these, hydroxyapatite is preferred in that it can efficiently convert the material alcohol as well as having a hydrogenation catalytic activity.

A calcium phosphate catalyst can be used even for an alcohol containing about 50% or less, preferably about 10% or less of water, hence it is particularly preferred to be used for bioethanol that is usually produced as water-containing products.

Hydroxyapatite is one type of calcium phosphate and is stoichiometrically shown by the constitution of $Ca_{10}(PO_4)_6(OH)_2$ as mentioned above. Even hydroxyapatite whose Ca/P molar ratio is less than 1.67 and fails to be stoichiometrical shows properties of hydroxyapatite and can take the apatite structure. Therefore, those synthesized hydroxyapatites with the Ca/P molar ratio of about 1.4-1.8 are also included. Especially, in the method for producing compositions of the present invention, those hydroxyapatites with the Ca/P molar ratio of 1.50-1.80, particularly 1.60-1.70 are preferred. Hydroxyapatite in any of the forms of granules, spheres, pellets, honeycombs, etc. can be used.

Further, hydroxyapatite may carry a metal catalyst or a metal ion catalyst that acts on alcohol. As for a metal catalyst or a metal ion catalyst acting on alcohol, a metal or a metal ion described in the Japanese Laid-Open Patent Application No. 5-305238 can be exemplified.

A kaolin clay mineral is a clay mineral having a basic structure of 1:1 for the tetrahedral layer and the octahedral layer. Examples of kaolin clay minerals include lizardite $[Mg_3Si_2O_5(OH)_4]$, berthierine $[(Fe^{2+},Fe^{3+},Mg)_{2-3}(Si,Al)_2O_5(OH)_4]$, amesite $[Mg_2Al(Si,Al)O_5(OH)_4]$, cronstedite $[Fe^{2+}Fe^{3+}(SiFe^{3+})O_5(OH)_4]$, nepouite $[Ni_3Si_2O_5(OH)_4]$, kellyite $[(Mn^{2+},Mg,Al)_3(Si,Al)_2O_5(OH)_4]$, fraiponite $[(Zn,Al)_3(Si,Al)_2O_5(OH)_4]$, brindleyite $[(Ni,Mg,Fe^{2+})_3(Si,Al)O_5(OH)_4]$, kaolinite $[Al_2Si_2O_5(OH)_4]$, deckite $[Al_2Si_2O_5(OH)_4]$, nacrite $[Al_2Si_2O_5(OH)_4]$, halloysite $[Al_2Si_2O_5(OH)_4]$, and odinite $[(Fe^{3+},Mg,Al,Fe^{2+})_{2-3}(Si,Al)_2O_5(OH)_4]$.

A pyrophylite clay mineral is a clay mineral having a basic structure of 2:1 for the tetrahedral layer and the octahedral layer. Examples of pyrophylite clay minerals include talc $[Mg_3Si_4O_{10}(OH)_2]$, willemseite $[(Ni,Mg)_3Si_4O_{10}(OH)_2]$, kerolite $[Mg_3Si_4O_{10}(OH)_2]$, pimelite $[Ni_3Si_4O_{10}(OH)_2]$, pyrophylite $[Al_2Si_4O_{10}(OH)_2]$, and ferripyrophylite $[Fe^{3+}Si_4O_{10}(OH)_2]$.

A smectite clay mineral is a clay mineral having a basic structure of 2:1 for the tetrahedral layer and the octahedral layer. Examples of smectite clay minerals include saponite $[(Ca/2,Na)_{0.3}(Mg,Fe^{2+})_3(Si,Al)_4O_{10}(OH)_2.4H_2O]$, hectolite $[Na_{0.3}(Mg,Li)_3Si_4O_{10}(F,OH)_2.4H_2O]$, sauconite $[Na_{0.3}Zn_3(Si,Al)_4O_{10}(OH)_2.4H_2O]$, stivensite $[(Ca/2)_{0.3}Mg_3Si_4O_{10}(OH)_2.4H_2O]$, swinefordite $[(Ca/2,Na)_{0.3}(Li,Mg)_2(Si,Al)_4O_{10}(OH,F)_2.2H_2O]$, montmorillonite $[(Ca/2,Na)_{0.3}(Al,Mg)_2(Si)_4O_{10}(OH)_2.nH_2O]$, beidellite $[(Ca/2,Na)_{0.3}Al_2(Si,Al)_4O_{10}(OH)_2.nH_2O]$, nontronite $[Na_{0.3}Fe^{3+}(Si,Al)_4O_{10}(OH)_2.nH_2O]$, and volkonskoit $[Ca_{0.3}(Cr^{3+},Mg,Fe^{3+})_3(Si,Al)_4O_{10}(OH)_2.nH_2O]$.

Hydrotalcite is a clay mineral having a composition of $Mg_6Al_2(OH)_{16}CO_3.4H_2O$, Sepiolite is a clay mineral having a composition of $Si_{12}Mg_8O_{30}(OH)_4(H_2O)_4.8H_2O$.

Chitin is a mucopolysaccharide in which N-acetyl-β-D-glucosamine are linked by 1,4 bonds. There is no particular limitation for a molecular weight of chitin, and usually the molecular weight is about 100,000 to 1 million.

A conversion rate of alcohols such as ethanol in the first step is usually 0.3-100.0%. Products obtained in the first step for which a hydrogenation reaction is conducted in the second step are exemplified by all reaction products consisting of a liquid phase comprising oxygen-containing compounds such as alcohols and aldehydes, water, hydrocarbons of 4-12 carbons, etc. and a gas phase which is light gas containing paraffins, olefins, dienes, alcohols, etc.; all liquid phase reaction products consisting of all reaction products from which light gas has been removed; and a liquid phase dehydration reaction products consisting of all reaction products from which light gas, unreacted ethanol and product water have been removed. Light gas used herein means a gas phase component that is obtained by passing the all reactant products in the first step through a cold trap of 10° C. under normal pressure, and that comprises at least one component selected from a group of gas consisting of methane, ethane, ethylene, propane, propylene, butane, butene, butadiene, etc.

When using ethanol as a starting material, all reaction products in the first step as described above can be exemplified by compositions respectively containing paraffins at 0-1.7 wt %, olefins at 0-60.3 wt %, dienes at 0-19.8 wt %, aromatics at 0-11.4 wt %, alcohols at 0-37.4 wt %, aldehydes at 0-5.4 wt %, ethers at 0-2.2 wt %, and product water at 0.1-38.8 wt % relative to the starting material ethanol. As such, various hydrocarbons such as paraffins, olefins, dienes, trienes, alcohols, ethers, ketones, aldehydes and esters are synthesized in the first step, but it is preferred to adjust synthesis conditions so as to obtain a hydrocarbon of 4-12 carbons as a major component. Further, since ethanol is used as a starting material in the first step, alcohols (linear alcohols) such as butanol, hexanol and octanol can be synthesized at a high yield in the liquid phase.

If the final product is used as a fuel composition for an internal combustion engine, the second step in the present invention turns out to be a step for improving the fuel properties as well as a step for improving oxidative stability of the fuel. In other words, as mentioned above, the first step gives various hydrocarbons. Whereas in the second step, compounds such as dienes and aldehydes that are unfavorable for a fuel composition as well as compounds such as olefins that are rather unfavorable in view of fuel stability can be reduced, and at the same time compounds such as paraffins and alcohols that are favorable for a fuel composition can be increased. As such, a fuel which has a remarkably high oxidative stability, a suppressed gum formation, and a high calorific value can be produced. In particular, oxidative stability is increased drastically. In addition, the yield of alcohol useful as a chemical industrial material is improved in the second step.

It is preferred to efficiently carry out a hydrogenation reaction with a hydrogenation catalyst in the second step. Any known hydrogenation catalyst which acts on dienes, aldehydes or aromatics may be used as a hydrogenation catalyst and the examples include metals such as Pd, Pt, Ru, Rh, Fe, Ni, Cu, Co, Cr, W, and Mo, or metal-carrying catalysts carrying these metals, preferably sponge catalysts (Raney catalysts) thereof that employ cheap transition metals. What are preferred among these are hydrogenation catalysts acting on dienes and aldehydes and more preferred are those hydrogenation catalysts acting on dienes, aldehyde and aromatics. Specifically, metal catalysts comprising Pt, Ni, Co, Pd, or Cu are particularly preferred. The hydrogenation reaction may be conducted in a 2-stage reaction using two types of catalysts.

The reaction of the present invention may be conducted either in a batch manner or in a sequential manner, but a reaction in a sequential manner is preferred from the standpoint of the industrial economic efficiency. Also, a gas phase reaction is preferred. Reactions in the first and the second steps may be conducted in the same reaction vessel or in different vessels.

In a gas phase reaction, the material alcohol gas may be introduced alone into a reaction vessel or it may be introduced into a reaction vessel together with a carrier gas. In the latter case, it is preferred to use hydrogen as whole or part of a carrier gas for alcohol gas, since it makes it possible to use the carrier gas hydrogen in a hydrogenation reaction in the second step and thus serves for an easy and effective progress of the reaction of the present invention. When hydroxyapatite is used as an alcohol conversion catalyst in the first step, a hydrogenation reaction proceeds in the first step as well due to the fact that a hydroxyapatite catalyst also functions as a hydrogenation catalyst. Therefore, the hydrogenation efficiency can be improved. It is preferred that hydrogen is introduced in the first step as a carrier gas as mentioned above, or it may be introduced after the completion of the first step (only in the second step). Amount of hydrogen to be introduced is preferably 10-1,000 vol % and more preferably 20-500 vol % relative to the material alcohol gas. Alternatively, hydrogen generated in the first step reaction may be used in a hydrogenation reaction without introducing hydrogen separately.

A reaction temperature employed in the present invention is usually 100-600° C. and preferably 200-500° C. in the first step. Especially, if it is desired to obtain alcohol at a high yield, a reaction temperature of 100-450° C. is preferred and 200-450° C. is more preferred. In the second step, a preferred reaction temperature is usually 0-600° C., where 0-400° C., in particular 80-300° C., is preferred.

Further, a reaction pressure of the present invention in the first step may be any one of a normal pressure, an increased pressure and a reduced pressure, and the reaction may be conducted, for example, at 1-200 atm. In the second step, while it may be conducted under a normal pressure, a reaction is preferred to be conducted under increased pressure and preferably at 2-100 atm. It is still more preferred to conduct a reaction at 10 atm or higher, since aromatics which comprise toxic benzene and generate soot can be reduced. When the first and the second steps are conducted in the same reaction vessel, reactions are conducted under similar pressures in the first and the second steps. The contact time with a catalyst in the first and the second steps are usually about 0.1-600 seconds and preferably about 0.4-60 seconds.

Compositions of the present invention are not particularly limited as long as the compositions are obtained by a production method wherein a hydrogenation reaction is conducted for all reaction products in the first step. When using ethanol as a starting material, specifically exemplified are those compositions containing paraffins at 0.5-64.0 wt %, olefins at 0-6.9 wt %, dienes at 0-2.1 wt % and aldehydes at 0.1-0.4 wt % relative to the starting material ethanol. Particularly exemplified among these are the compositions containing C1 paraffins at 0.1-4.3 wt % (methane), C2 paraffins at 0.2-62.2 wt % (ethane), C4 paraffins at 0.1-12.9 wt % (butane), C6 paraffins at 0-10.3 wt %, and C8 paraffins at 0-4.5 wt % relative to the starting material ethanol.

Further, compositions of the present invention are not particularly limited as long as the compositions are obtained by a production method wherein a hydrogenation reaction is conducted for all liquid phase reaction products consisting of all reaction products from which light gas has been removed in the first step. When using ethanol as a starting material, specifically exemplified are those compositions containing paraffins at 0.3-28.9 wt %, olefins at 0-1.6 wt %, dienes at 0-0.7 wt % and aldehydes at 0.1-0.2 wt % relative to the starting material ethanol. Particularly exemplified among these are the compositions containing C1 paraffins at 0-1.9 wt %, C2 paraffins at 0.1-2.2 wt %, C4 paraffins at 0.1-2.4 wt %, C6 paraffins at 0-12.2 wt % and C8 paraffins at 0-5.5 wt % relative to the starting material ethanol.

Further, compositions of the present inventions are not particularly limited as long as the compositions are obtained by a production method wherein a hydrogenation reaction is conducted for liquid phase dehydration reaction products consisting of all reaction products from which light gas, unreacted ethanol and product water have been removed in the first step. When using ethanol as a starting material, specifically exemplified are those compositions containing paraffins at 0.2-29.2 wt %, olefins at 0-1.3 wt %, dienes at 0-0.4 wt % and aldehydes at 0-0.1 wt % relative to the starting material ethanol. Particularly exemplified among these are the compositions containing C1 paraffins at 0.1-1.3 wt %, C2 paraffins at 0.1-1.4 wt %, C4 paraffins at 0-1.9 wt %, C6 parffins at 0-13.3 wt % and C8 paraffins at 0-6.5 wt % relative to the starting material ethanol.

Still further, compositions of the present inventions are not particularly limited as long as the compositions are obtained by a production method wherein a hydrogenation reaction is conducted for light gas in the first step. When using ethanol as a starting material, specifically exemplified are those compositions containing paraffins at 1.2-64.2 wt %, olefins at 0-0.5 wt %, and dienes at 0-0.5 wt % relative to the starting material ethanol. Particularly exemplified among these are the compositions containing C1 paraffins at 0-0.3 wt %, C2 paraffins at 0.4-64.2 wt %, C4 paraffins at 0-7.7 wt % relative to the starting material ethanol.

Further, preferably exemplified as compositions of the present invention using ethanol as a starting material include: compositions containing paraffins at 0.2-70.0 wt %, preferably 0.2-64.2 wt % relative to the starting material ethanol; compositions containing alcohols at 0-50.0 wt %, preferably 0-40.4 wt % relative to the starting material ethanol; and compositions containing paraffins at 0.2-70.0 wt %, preferably 0.2-64.2 wt % and alcohols at 0-50.0 wt %, preferably 0-40.4 wt % relative to the starting material ethanol.

Further, preferably exemplified as compositions of the present invention using ethanol as a starting material include: compositions containing olefins at 0-10 wt %, preferably 0-6.3 wt % relative to the starting material ethanol; compositions containing dienes at 0-3 wt %, preferably 0-2.1 wt % relative to the starting material ethanol; compositions containing aldehydes at 0-1 wt %, preferably 0-0.4 wt % relative to the starting material ethanol; compositions containing olefins at 0-10 wt %, preferably 0-6.3 wt % and dienes at 0-3 wt %, preferably 0-2.1 wt % relative to the starting material ethanol; compositions containing olefins at 0-10 wt %, preferably 0-6.3 wt % and aldehydes at 0-1 wt %, preferably 0-0.4 wt % relative to the starting material ethanol; compositions containing dienes at 0-3 wt %, preferably 0-2.1 wt % and aldehydes at 0-1 wt %, preferably 0-0.4 wt % relative to the starting material ethanol; and compositions containing olefins at 0-10 wt %, preferably 0-6.3 wt %, dienes at 0-3 wt %, preferably 0-2.1 wt %, and aldehydes at 0-1 wt %, preferably 0-0.4 wt % relative to the starting material ethanol.

Compositions of the present invention as above may be used as a fuel composition etc., as a mixture as is. Alternatively, it may be used as a chemical industrial material by separating and purifying the organic compound of the interest by a conventionally practiced separation and purifying methods including distillation, micropore-membrane separation, extraction, and adsorption.

When compositions of the present invention, and compositions of the present invention having ethanol as a starting material are used as a fuel composition for the internal combustion engine, the compositions show a remarkable utility as a fuel composition for the internal combustion engine with an improved fuel oxidation stability wherein the olefin and diene contents are decreased and paraffin content is increased, and wherein the aldehyde content is decreased and the alcohol content is increased. Further the compositions are useful as a fuel composition for the internal combustion engine wherein the gum content is lower than the level defined by JIS standard for fuel compositions due to a hydrogenation reaction in the second step.

An embodiment of the method for producing compositions of the present invention is explained with reference to the drawing. FIG. 1 is a schematic view explaining a device for use in the method of the present invention for producing compositions. As shown in FIG. 1, the device in this Embodiment is a device using the same reaction tube (reaction vessel). An alcohol conversion catalyst to be used in the first step is filled in the upper part of the reaction tube located at the center the device, and a hydrogenation catalyst to be used in the second step is filled in the lower part. Further, each site where the reactions in the first and the second steps are conducted is respectively provided with an electric furnace so that reaction temperatures in the first and the second steps can be adjusted respectively.

In this embodiment, ethanol gas, the starting material, is introduced with hydrogen from above the reaction tube. In other words, ethanol gas introduced into the reaction tube comes to contact with an alcohol conversion catalyst, which results in synthesis of mainly hydrocarbons of 4-12 carbons (fuel component) (first step). Subsequently, hydrogen introduced with the starting material becomes active by contacting with a hydrogenation catalyst and a hydrogenation reaction occurs against the fuel component synthesized in the first step (second step). The fuel composition is thus produced. All reaction products or a part thereof in the first step may be temporarily stored in a tank and introduced as necessary into the second step to conduct a hydrogenation reaction.

The present invention will be explained below in more detail with reference to the Examples. The technical scope of the present invention, however, shall not be limited only to these exemplifications.

EXAMPLES

Example 1

Catalyst

Alcohol Conversion Catalyst: Hydroxyapatite Catalyst

A hydroxyapatite catalyst (HAP catalyst) was prepared according to a precipitation method. All the materials used are the first-class reagents manufactured by Wako Pure Chemical Industrial Ltd. Procedures are as follows.

Starting materials were a 0.60 mol/l aqueous solution of calcium nitrate tetrahydrate adjusted to pH10 with ammonia water, and a 0.40 mol/l aqueous solution of diammonium hydrogen phosphate adjusted to pH10 with ammonia water. The material solutions were dropped separately to distilled water by solution-sending pumps after adjusting the solution-sending rate in order that HAP of a certain Ca/P molar ratio can be synthesized. After the certain amounts had been dripped, the resulting solution was stirred well for 24 hours, then filtered, washed with water, and dried at 140° C. Thus obtained powders were added with an ion-exchanged water to obtain a suspension with the HAP concentration of 10 wt %. Subsequently, the suspension was matured and dried at 140° C. in a dryer, ground in a mortar, and baked for 2 hours at 600° C. in the atmosphere to obtain powdery HAP catalyst.

Thus synthesized HAP catalyst was identified by a powder X-ray diffraction and the specific surface area (BET) level was determined. The Ca/P molar ratio of the catalyst was determined by a calibration curve method using a fluorescent X-ray. It was identified by the powder X-ray diffraction that the catalyst was constituted of a single phase of hydroxyapatite and that the specific surface area (BET) level was 33 m$^2$/g and the Ca/P molar ratio being 1.64. The HAP powders were molded into pellets with a tablet compressor, which was then lightly ground to the mesh size of 14-26 for use in the ethanol conversion reaction.

Hydrogenation Catalyst

A sponge nickel catalyst (NDT-90) from Kawaken Fine Chemicals Co., Ltd. was used as a hydrogenation catalyst. Heat generation due to a hydrogenation reaction was taken into account, and powders of the nickel catalyst were used which had been diluted to 4-folds with calcium phosphate (β-TCP) that is inactive to ethanol. The powders were molded into pellets with a tablet compressor, which was then lightly ground to the mesh size of 14-26 for use.

Production of a Fuel Composition

A fixed-bed flow reactor was used. 1.8 g of the above-mentioned HAP catalyst was filled as a first stage catalyst to the upper part of a reaction tube of 10 mmφ internal diameter manufactured by SUS, and 1.0 g of the above-mentioned hydrogenation catalyst was filled as a second stage catalyst to the lower part of the reaction tube. A mixed gas of ethanol and hydrogen was introduced from above the reaction tube and the reaction product was analyzed. Ethanol gas was provided at 67 ml/min and hydrogen was provided at two levels of 0 ml/min and 200 ml/min. The reaction pressure was set at two levels of 1.0 atm and 7.9 atm. Specific reaction conditions are shown in Table 1. Test Examples 1-1 and 1-3 are the examples in which hydrogen is introduced in the first stage as admixed with the starting material ethanol gas. Test Example 1-2 is an example in which hydrogen is added in the second stage. Test Example 1-4 which was conducted with a hydrogen supply of 0 ml/min is an example in which a hydrogenation reaction is conducted using hydrogen generated in the first stage reaction and without introducing hydrogen. In this case, helium gas was used as a carrier gas.

For comparison purpose, a fuel composition was produced, without conducting a hydrogenation reaction of the second step, by using a reaction tube (10 mmφ internal diameter; SUS) filled with 1.8 g of the above-mentioned HAP catalyst. Then the reaction products were analyzed. Comparative Example 1-1 is an example in which ethanol gas was introduced with hydrogen from above the reaction tube and Comparative Example 1-2 is an example in which ethanol gas was introduced with helium gas from above the reaction tube.

Thus obtained reaction products were subjected to a qualitative analysis using a gas chromatograph mass spectrometer (GC-MS) at the range of M/Z=10-400 and a quantitative analysis was performed using a gas chromatography (GC-FID). A sensitivity correction factor of the carbon mole was used for quantifying oxygenated compounds. For both devices, columns from J&W Scientific (Liquid Phase: DB-1, Film Thickness: 5.00 μm, column Dimension: 30 m×0.323 mm) were used. Selectivity rates of the reaction products were calculated from the following equation:

Selectivity rate of the reaction product ($C$–wt %)=number of carbon moles of the reaction product/number of carbon moles of reacted alcohol×100

A reaction product yield (wt %) was calculated by calculating the weight of a product based on the FID result ($C$–wt %) and expressing this as a percentage of total ethanol supplied, taken as 100 wt %.

The results are shown below. Table 1 shows compositions of the fuel components in each of Test Examples. Tables 2-7 show more detailed composition of each test.

TABLE 1

| | Test Example 1-1 First stage introduction | Test Example 1-2 Second stage introduction | Test Example 1-3 First stage introduction | Test Example 1-4 (Auto Hydrogenation) | Comparative Example 1-1 | Comparative Example 1-2 | Test Example 2 First stage introduction | Comparative Example 2 |
|---|---|---|---|---|---|---|---|---|
| Reaction Stage | 2-Stage reaction | 2-Stage reaction | 2-Stage reaction | 2-Stage reaction | Single-Stage reaction | Single-Stage reaction | 2-Stage reaction | Single-Stage reaction |
| Mixed quantity of hydrogen (ml/min.) | 200 | 200 | 200 | 0 | 200 | 0 | 100 | 0 |
| First stage reaction temperature | 490 | 490 | 490 | 490 | 490 | 490 | 410 | 410 |
| Second stage reaction temperature | 186 | 190 | 186 | 165 | — | — | 180 | — |
| Pressure (atmospheric pressure) | 1.0 | 1.0 | 7.9 | 7.9 | 1.0 | 1.0 | 10.0 | 1.0 |
| Components/wt % | | | | | | | | |
| Hydrocarbons | | | | | | | | |
| Paraffins | 39.2 | 38.3 | 44.8 | 9.6 | 1.7 | 1.7 | 10.2 | 0.0 |
| Olefins | 6.3 | 6.9 | 3.1 | 33.0 | 20.6 | 18.0 | 1.2 | 3.7 |
| Dienes | 0.4 | 0.5 | 0.0 | 1.7 | 11.3 | 13.6 | 0.0 | 4.6 |
| Aromatics | 8.6 | 8.9 | 5.3 | 6.4 | 11.0 | 11.4 | 0.7 | 1.4 |
| Others | 0.0 | 0.0 | 0.1 | 0.0 | 0.0 | 0.0 | 0.0 | 0.0 |
| (Subtotal) | 54.5 | 54.6 | 53.4 | 50.7 | 44.7 | 44.7 | 12.1 | 9.7 |
| Oxygenates | | | | | | | | |
| Ethanol | 1.3 | 1.0 | 0.9 | 1.2 | 0.7 | 0.5 | 32.0 | 32.8 |
| Other alcohols | 1.9 | 1.7 | 2.1 | 3.9 | 3.1 | 2.1 | 35.2 | 31.4 |
| Aldehydes | 0.2 | 0.3 | 0.1 | 1.1 | 3.5 | 4.5 | 0.3 | 5.4 |
| Ethers | 0.2 | 0.2 | 0.1 | 1.3 | 0.9 | 1.0 | 0.1 | 0.2 |
| Ketones | 0.9 | 1.1 | 2.5 | 0.9 | 2.6 | 2.7 | 0.4 | 0.5 |
| Others | 0.0 | 0.0 | 0.0 | 0.7 | 0.3 | 0.3 | 0.0 | 0.0 |
| (Subtotal) | 4.4 | 4.2 | 5.8 | 9.1 | 11.2 | 11.1 | 67.9 | 70.4 |
| Unidentified | 4.5 | 4.4 | 4.8 | 3.5 | 6.4 | 6.4 | 1.4 | 1.6 |
| Water | 36.9 | 36.9 | 36.6 | 36.0 | 35.3 | 35.3 | 18.6 | 17.7 |
| Total | 100.2 | 100.2 | 100.5 | 99.3 | 97.6 | 97.5 | 100.1 | 99.3 |

TABLE 2

| | Test Eaxmple 1-1 | | | | | | | | | | |
|---|---|---|---|---|---|---|---|---|---|---|---|
| | Carbon number | | | | | | | | | | |
| Components/wt % | 1 | 2 | 3 | 4 | 5 | 6 | 7 | 8 | 9 | 10 more | Total |
| Hydrocarbons | | | | | | | | | | | |
| Paraffins | 3.3 | 8.5 | 1.8 | 11.5 | 1.3 | 7.5 | 0.9 | 3.1 | 0.3 | 0.9 0.1 | 39.2 |
| Olefins | | | | 2.7 | 0.4 | 2.3 | 0.1 | 0.9 | | | 6.3 |
| Dienes | | | | | | 0.3 | | 0.1 | | | 0.4 |

TABLE 2-continued

Test Eaxmple 1-1

| Components/wt % | \multicolumn{11}{c}{Carbon number} | |
|---|---|---|---|---|---|---|---|---|---|---|---|---|
| | 1 | 2 | 3 | 4 | 5 | 6 | 7 | 8 | 9 | 10 | more | Total |
| Aromatics | | | | | | 3.9 | 0.5 | 2.9 | 0.3 | 1.0 | | 8.6 |
| Others | | | | | | | | | | | | 0.0 |
| (Subtotal) | 3.3 | 8.5 | 1.8 | 14.2 | 1.8 | 13.9 | 1.5 | 6.9 | 0.7 | 1.8 | 0.1 | 54.5 |
| Oxygenates | | | | | | | | | | | | |
| Alcohols | | 1.3 | 0.1 | 1.1 | 0.1 | 0.5 | | | | | | 3.1 |
| Aldehydes | | 0.2 | | | | | | | | | | 0.2 |
| Ethers | | | | 0.2 | | | | | | | | 0.2 |
| Ketones | | | 0.6 | 0.1 | 0.1 | | | | | | | 0.9 |
| Others | | | | | | | | | | | | 0.0 |
| (Subtotal) | 0.0 | 1.5 | 0.7 | 1.4 | 0.3 | 0.5 | 0.0 | 0.0 | 0.0 | 0.0 | 0.0 | 4.4 |
| Unidentified | | | | | | | | | | | 4.5 | 4.5 |
| Water | | | | | | | | | | | | 36.9 |
| Total | 3.3 | 9.9 | 2.6 | 15.6 | 2.0 | 14.4 | 1.5 | 6.9 | 0.7 | 1.8 | 4.6 | 100.2 |

TABLE 3

Test Example 1-2

| Components/wt % | \multicolumn{11}{c}{Carbon number} | |
|---|---|---|---|---|---|---|---|---|---|---|---|---|
| | 1 | 2 | 3 | 4 | 5 | 6 | 7 | 8 | 9 | 10 | more | Total |
| Hydrocarbons | | | | | | | | | | | | |
| Paraffins | 3.3 | 8.4 | 1.7 | 11.2 | 1.3 | 7.3 | 0.9 | 3.0 | 0.3 | 0.8 | 0.1 | 38.3 |
| Olefins | | | | 2.8 | 0.5 | 2.4 | 0.2 | 1.0 | | | 0.1 | 6.9 |
| Dienes | | | | | | 0.4 | | 0.2 | | | | 0.5 |
| Aromatics | | | | | | 3.9 | 0.6 | 2.9 | 0.4 | 1.0 | | 8.9 |
| Others | | | | | | | | | | | | 0.0 |
| (Subtotal) | 3.3 | 8.4 | 1.7 | 14.0 | 1.8 | 13.9 | 1.6 | 7.1 | 0.7 | 1.9 | 0.2 | 54.6 |
| Oxygenates | | | | | | | | | | | | |
| Alcohols | | 1.0 | 0.1 | 1.0 | 0.2 | 0.4 | | | | | | 2.7 |
| Aldehydes | | 0.3 | | | | | | | | | | 0.3 |
| Ethers | | | | 0.2 | | | | | | | | 0.2 |
| Ketones | | | 0.8 | 0.2 | 0.1 | | | | | | | 1.1 |
| Others | | | | | | | | | | | | 0.0 |
| (Subtotal) | 0.0 | 1.3 | 0.9 | 1.3 | 0.3 | 0.4 | 0.0 | 0.0 | 0.0 | 0.0 | 0.0 | 4.2 |
| Unidentified | | | | | | | | | | | 4.4 | 4.4 |
| Water | | | | | | | | | | | | 36.9 |
| Total | 3.3 | 9.7 | 2.6 | 15.3 | 2.1 | 14.4 | 1.6 | 7.1 | 0.7 | 1.9 | 4.6 | 100.2 |

TABLE 4

Test Example 1-3

| Components/wt % | \multicolumn{11}{c}{Carbon number} | |
|---|---|---|---|---|---|---|---|---|---|---|---|---|
| | 1 | 2 | 3 | 4 | 5 | 6 | 7 | 8 | 9 | 10 | more | Total |
| Hydrocarbons | | | | | | | | | | | | |
| Paraffins | 4.3 | 5.9 | 2.2 | 12.9 | 2.2 | 9.2 | 1.4 | 4.5 | 0.5 | 1.3 | 0.4 | 44.8 |
| Olefins | | | | 0.1 | 0.1 | 1.3 | 0.5 | 1.2 | | | | 3.1 |
| Dienes | | | | | | | | | | | | 0.0 |
| Aromatics | | | | | | 1.6 | 0.4 | 2.0 | 0.4 | 0.9 | | 5.3 |
| Others | | | | | | | | 0.1 | | | | 0.1 |
| (Subtotal) | 4.3 | 5.9 | 2.2 | 13.0 | 2.3 | 12.0 | 2.3 | 7.8 | 1.0 | 2.2 | 0.4 | 53.4 |

TABLE 4-continued

Test Example 1-3

| Components/wt % | \multicolumn{11}{c}{Carbon number} |
|---|---|---|---|---|---|---|---|---|---|---|---|---|
| | 1 | 2 | 3 | 4 | 5 | 6 | 7 | 8 | 9 | 10 | more | Total |
| Oxygenates | | | | | | | | | | | | |
| Alcohols | | 0.9 | 0.2 | 0.9 | 0.3 | 0.5 | | 0.3 | | | | 3.1 |
| Aldehydes | | 0.1 | | | | | | | | | | 0.1 |
| Ethers | | | | 0.1 | | | | | | | | 0.1 |
| Ketones | | | 1.2 | 0.1 | 1.2 | | | | | | | 2.5 |
| Others | | | | | | | | | | | | 0.0 |
| (Subtotal) | 0.0 | 1.0 | 1.4 | 1.0 | 1.5 | 0.5 | 0.0 | 0.3 | 0.0 | 0.0 | 0.0 | 5.8 |
| Unidentified | | | | | | | | | | | 4.8 | 4.8 |
| Water | | | | | | | | | | | | 36.6 |
| Total | 4.3 | 6.9 | 3.6 | 14.0 | 3.8 | 12.5 | 2.3 | 8.1 | 1.0 | 2.2 | 5.2 | 100.5 |

TABLE 5

Test Example 1-4

| Components/wt % | \multicolumn{11}{c}{Carbon number} |
|---|---|---|---|---|---|---|---|---|---|---|---|---|
| | 1 | 2 | 3 | 4 | 5 | 6 | 7 | 8 | 9 | 10 | more | Total |
| Hydrocarbons | | | | | | | | | | | | |
| Paraffins | 3.4 | 0.4 | | 2.8 | 0.1 | 2.1 | 0.1 | 0.6 | | | | 9.6 |
| Olefins | | 7.6 | 3.2 | 10.8 | 2.9 | 5.5 | 1.2 | 1.4 | | 0.4 | | 33.0 |
| Dienes | | | | 0.1 | | 0.3 | 0.5 | 0.8 | | | | 1.7 |
| Aromatics | | | | | | 1.7 | 0.9 | 2.3 | 0.6 | 0.8 | | 6.4 |
| Others | | | | | | | | | | | | 0.0 |
| (Subtotal) | 3.4 | 8.0 | 3.2 | 13.7 | 3.0 | 9.6 | 2.8 | 5.2 | 0.6 | 1.2 | 0.0 | 50.7 |
| Oxygenates | | | | | | | | | | | | |
| Alcohols | | 1.2 | 0.3 | 1.7 | 0.6 | 0.9 | | 0.4 | | | | 5.1 |
| Aldehydes | | 0.5 | 0.1 | 0.3 | 0.2 | 0.1 | | | | | | 1.1 |
| Ethers | | | | 1.3 | | | | | | | | 1.3 |
| Ketones | | | 0.3 | 0.1 | 0.5 | | | | | | | 0.9 |
| Others | | | | | | 0.7 | | | | | | 0.7 |
| (Subtotal) | 0.0 | 1.7 | 0.7 | 3.4 | 1.2 | 1.7 | 0.0 | 0.4 | 0.0 | 0.0 | 0.0 | 9.1 |
| Unidentified | | | | | | | | | | | 3.5 | 3.5 |
| Water | | | | | | | | | | | | 36.0 |
| Total | 3.4 | 9.7 | 3.9 | 17.1 | 4.3 | 11.3 | 2.8 | 5.6 | 0.6 | 1.2 | 3.5 | 99.3 |

TABLE 6

Comparative Example 1-1

| Components/wt % | \multicolumn{11}{c}{Carbon number} |
|---|---|---|---|---|---|---|---|---|---|---|---|---|
| | 1 | 2 | 3 | 4 | 5 | 6 | 7 | 8 | 9 | 10 | more | Total |
| Hydrocarbons | | | | | | | | | | | | |
| Paraffins | 0.7 | 1.0 | | | | | | | | | | 1.7 |
| Olefins | | 3.3 | 2.5 | 5.0 | 2.3 | 4.9 | 0.4 | 2.1 | | | | 20.6 |
| Dienes | | | | 6.1 | 0.5 | 3.4 | | 1.3 | | | | 11.3 |
| Aromatics | | | | | | 4.2 | 0.5 | 4.2 | 0.2 | 1.5 | 0.4 | 11.0 |
| Others | | | | | | | | | | | | 0.0 |
| (Subtotal) | 0.7 | 4.4 | 2.5 | 11.1 | 2.8 | 12.6 | 0.9 | 7.6 | 0.2 | 1.5 | 0.4 | 44.7 |
| Oxygenates | | | | | | | | | | | | |
| Alcohols | | 0.7 | 0.1 | 0.7 | 0.3 | 0.8 | | 0.7 | | 0.5 | | 3.8 |
| Aldehydes | | 0.7 | | 0.6 | | 1.2 | | 1.0 | | | | 3.5 |
| Ethers | | | | 0.4 | | 0.5 | | | | | | 0.9 |
| Ketones | | | 0.6 | | 1.3 | | 0.8 | | | | | 2.6 |

TABLE 6-continued

Comparative Example 1-1

| Components/wt % | Carbon number | | | | | | | | | | | |
|---|---|---|---|---|---|---|---|---|---|---|---|---|
| | 1 | 2 | 3 | 4 | 5 | 6 | 7 | 8 | 9 | 10 | more | Total |
| Others | | | | | | | | | | | 0.3 | 0.3 |
| (Subtotal) | 0.0 | 1.4 | 0.7 | 1.8 | 1.6 | 2.6 | 0.8 | 1.7 | 0.0 | 0.5 | 0.3 | 11.2 |
| Unidentified | | | | | | | | | | | 6.4 | 6.4 |
| Water | | | | | | | | | | | | 35.3 |
| Total | 0.7 | 5.8 | 3.2 | 12.9 | 4.4 | 15.2 | 1.7 | 9.3 | 0.2 | 1.9 | 7.1 | 97.6 |

TABLE 7

Comparative Example 1-2

| Components/wt % | Carbon number | | | | | | | | | | | |
|---|---|---|---|---|---|---|---|---|---|---|---|---|
| | 1 | 2 | 3 | 4 | 5 | 6 | 7 | 8 | 9 | 10 | more | Total |
| Hydrocarbons | | | | | | | | | | | | |
| Paraffins | 0.7 | 1.0 | | | | | | | | | | 1.7 |
| Olefins | | 3.4 | 2.6 | 4.0 | 1.7 | 4.2 | 0.5 | 1.7 | | | | 18.0 |
| Dienes | | | | 7.2 | 0.7 | 4.2 | | 1.6 | | | | 13.6 |
| Aromatics | | | | | | 4.3 | 0.6 | 4.3 | 0.2 | 1.6 | 0.4 | 11.4 |
| Others | | | | | | | | | | | | 0.0 |
| (Subtotal) | 0.7 | 4.4 | 2.6 | 11.2 | 2.4 | 12.7 | 1.1 | 7.6 | 0.2 | 1.6 | 0.4 | 44.7 |
| Oxygenates | | | | | | | | | | | | |
| Alcohols | | 0.5 | 0.1 | 0.3 | 0.3 | 0.5 | | 0.5 | | 0.3 | | 2.6 |
| Aldehydes | | 1.1 | | 0.9 | | 1.4 | | 1.1 | | | | 4.5 |
| Ethers | | | | 0.4 | | 0.6 | | | | | | 1.0 |
| Ketones | | | 0.6 | | 1.3 | | 0.8 | | | | | 2.7 |
| Others | | | | | | | | | | | 0.3 | 0.3 |
| (Subtotal) | 0.0 | 1.6 | 0.7 | 1.6 | 1.7 | 2.6 | 0.8 | 1.6 | 0.0 | 0.3 | 0.3 | 11.1 |
| Unidentified | | | | | | | | | | | 6.4 | 6.4 |
| Water | | | | | | | | | | | | 35.3 |
| Total | 0.7 | 5.9 | 3.3 | 12.8 | 4.0 | 15.2 | 1.8 | 9.2 | 0.2 | 1.9 | 7.1 | 97.5 |

Comparison of Test Examples and Comparative Examples in Table 1 reveals that dienes and aldehydes that are unfavorable as a fuel composition are reduced drastically but paraffins and alcohols favorable as a fuel composition are increased in the 2-stage reaction method conducted for Test Examples. It is shown from Test Examples 1-1 and 1-3 that dienes unfavorable as a fuel composition further decreases and aromatic compounds wreaking soot also decreases by pressurization. It is also demonstrated from Test Examples 1-1 and 1-2 that introduction of hydrogen at the first stage results in decrease in dienes and aldehydes and increase in paraffins and alcohols. Namely, it can be seen that hydrogenation reaction proceeds in the first stage reaction as well, demonstrating that a hydroxyapatite catalyst acts as a hydrogenation catalyst. Similarly, it has been shown from Comparative Examples 1-1 and 1-2 that a hydroxyapatite catalyst acts as a hydrogenation catalyst. In addition, it is shown from Test Example 1-4 and Comparative Example 1-2 that hydrogenation is possible in the second stage (second step) by using hydrogen generated in the first stage (first step) and without adding hydrogen separately.

Further, Test Example 1-1 and Comparative Example 1-2 were scaled up by about 6 folds, and the reaction products were liquefied by cold trap at 0° C. under a normal pressure. Samples were prepared by subjecting the liquid fraction to a simple distillation at room temperature to 210° C., which samples were then determined for items (research octane level, oxidative stability, unwashed and actual gum, calorific value) stipulated by the JIS standard concerning fuel compositions (JIS K 2202). The results are shown in Table 8.

TABLE 8

| | Test Example1-1 | Comparative example 1-2 | JIS Standard |
|---|---|---|---|
| Octane level | 96.1 | 99.2 | 89.0 or above |
| Oxidative stability (min) | 1440 or above | 60 | 240 or above |
| Unwashed and actual gum (mg/100 ml) | 19 | 381 | 20 or below |
| Calorific value (J/g) | 39260 | — | |

As is clear from Table 8, the research octane level (RON) of the sample in Test Example 1-1 is lower than that of the sample in Comparative Example 1-2, but still higher than 89.0 which is the required octane level for regular gasoline. Oxygen stability of the sample in Test Example 1-1 has been improved to 1440 min or more from 60 min of the sample in Comparative Example 1-2, which turns out to be a fairy high stability in respect of the JIS standard. The unwashed and actual gum has also been largely reduced so as to be within the range of the JIS standard. The calorific value of the sample in Test Example 1-1 was 31.6 MJ/L (39260 J/g) which was lower than the level of 34.6 MJ/L, the gasoline calorific value, but higher than the levels of 22.7 MJ/L for ethanol and 26.8 MJ/L for butanol.

Further, test run was carried out with motorcycles equipped with the AA01E air-cooled 4 stroke OHC single-cylinder engine which is loaded with the fuel sample of Test Example 1-1. As a result, it was confirmed that the driving performance was similar to that of when commercial gasoline was used.

Example 2

Catalyst

The catalyst similar to that used in Example 1 was used.
Production of a Fuel Composition (Production of Alcohol)

A fixed-bed flow reactor was used. 2.0 g of the HAP catalyst was filled as a first stage catalyst to the upper part of a reaction tube of 10 mmφ internal diameter (SUS), and 1.0 g of the above-mentioned hydrogenation catalyst was filled as a second stage catalyst to the lower part of the reaction tube. A mixed gas of ethanol and hydrogen was introduced from above the reaction tube and the reaction product was analyzed. Ethanol gas was provided at 26 ml/min and hydrogen was provided at 100 ml/min. The reaction pressure was set at 10 atm.

For comparison purpose, a fuel composition was produced without conducting a hydrogenation reaction in the second step. 2.0 g of the HAP catalyst was filled in a reaction tube of 10 mmφ internal diameter (SUS). Ethanol gas (26 ml/min) was introduced with a carrier gas from above the reaction tube and the reaction product was analyzed.

Analysis results for the above samples are shown in Table 1 (Test Example 2, Comparative Example 2), Table 9 and Table 10.

TABLE 9

Test Example 2

| Components/wt % | Carbon number | | | | | | | | | | | |
|---|---|---|---|---|---|---|---|---|---|---|---|---|
| | 1 | 2 | 3 | 4 | 5 | 6 | 7 | 8 | 9 | 10 | more | Total |
| Hydrocarbons | | | | | | | | | | | | |
| Paraffins | 0.8 | 1.5 | 0.1 | 3.4 | 0.1 | 2.2 | 0.1 | 1.6 | | 0.1 | 0.2 | 10.2 |
| Olefins | | | | 0.1 | | 0.7 | 0.1 | 0.3 | | | | 1.2 |
| Dienes | | | | | | | | | | | | 0.0 |
| Aromatics | | | | | | 0.2 | 0.1 | 0.3 | | 0.1 | 0.2 | 0.7 |
| Others | | | | | | | | | | | | 0.0 |
| (Subtotal) | 0.8 | 1.5 | 0.1 | 3.5 | 0.1 | 3.0 | 0.3 | 2.2 | 0.0 | 0.2 | 0.4 | 12.1 |
| Oxygenates | | | | | | | | | | | | |
| Alcohols | | 32.0 | | 22.3 | 0.1 | 8.2 | | 3.1 | | 1.4 | | 67.2 |
| Aldehydes | | 0.3 | | | | | | | | | | 0.3 |
| Ethers | | | | 0.1 | | | | | | | | 0.1 |
| Ketones | | | 0.0 | | 0.1 | | 0.2 | | | | | 0.4 |
| Others | | | | | | 0.0 | | | | | | 0.0 |
| (Subtotal) | 0.0 | 32.3 | 0.0 | 22.4 | 0.3 | 8.2 | 0.2 | 3.1 | 0.0 | 1.4 | 0.0 | 67.9 |
| Unidentified | | | | | | | | | | | 1.4 | 1.4 |
| Water | | | | | | | | | | | | 18.6 |
| Total | 0.8 | 33.8 | 0.1 | 25.8 | 0.4 | 11.3 | 0.5 | 5.3 | 0.0 | 1.6 | 1.8 | 100.1 |

TABLE 10

Comparative Example 2

| Components/wt % | Carbon number | | | | | | | | | | | |
|---|---|---|---|---|---|---|---|---|---|---|---|---|
| | 1 | 2 | 3 | 4 | 5 | 6 | 7 | 8 | 9 | 10 | more | Total |
| Hydrocarbons | | | | | | | | | | | | |
| Paraffins | 0.0 | | | | | | | | | | | 0.0 |
| Olefins | | 1.5 | 0.2 | 1.1 | 0.1 | 0.5 | 0.0 | 0.3 | | | | 3.7 |
| Dienes | | | 2.5 | 0.0 | 1.5 | | 0.6 | | | | | 4.6 |
| Aromatics | | | | | | 0.3 | 0.1 | 0.7 | | 0.1 | 0.2 | 1.4 |
| Others | | | | | | | | | | | | 0.0 |
| (Subtotal) | 0.0 | 1.5 | 0.2 | 3.6 | 0.2 | 2.3 | 0.1 | 1.6 | 0.0 | 0.1 | 0.2 | 9.7 |
| Oxygenates | | | | | | | | | | | | |
| Alcohols | | 32.8 | | 21.2 | 0.1 | 7.2 | | 2.0 | | 0.8 | | 64.2 |
| Aldehydes | | 1.4 | | 1.3 | | 1.3 | | 0.9 | | 0.5 | | 5.4 |
| Ethers | | | | 0.1 | | 0.1 | | | | | | 0.2 |

TABLE 10-continued

Comparative Example 2

| Components/wt % | Carbon number | | | | | | | | | | | |
|---|---|---|---|---|---|---|---|---|---|---|---|---|
| | 1 | 2 | 3 | 4 | 5 | 6 | 7 | 8 | 9 | 10 | more | Total |
| Ketones | | | 0.0 | | 0.1 | | 0.4 | | | | | 0.5 |
| Others | | | | | | 0.0 | | | | | | 0.0 |
| (Subtotal) | 0.0 | 34.2 | 0.0 | 22.6 | 0.3 | 8.6 | 0.4 | 3.0 | 0.0 | 1.4 | 0.0 | 70.4 |
| Unidentified | | | | | | | | | | | 1.6 | 1.6 |
| Water | | | | | | | | | | | | 17.7 |
| Total | 0.0 | 35.7 | 0.2 | 26.1 | 0.5 | 10.8 | 0.5 | 4.5 | 0.0 | 1.5 | 1.8 | 99.3 |

It was revealed from Test Examples and Comparative Examples in Tables 1, 9 and 10 that dienes and aldehydes that are unfavorable as a fuel composition are reduced drastically but paraffins and alcohols that are favorable as a fuel composition are increased in the 2-stage reaction method conducted for Test Examples as compared to the single-stage reaction method conducted for Comparative Examples. Especially, it has been demonstrated that alcohols (butanol, hexanol, octanol, etc.) can be obtained at a high yield according to the Test Examples. Here, most of butanol was 1-butanol.

Example 3

Catalyst

Alcohol Conversion Catalyst: Hydrotalcite Catalyst

A hydrotalcite catalyst used was a first-class reagent manufactured by Wako Pure Chemical Industrial Ltd.
Hydrogenation Catalyst A hydrogenation catalyst similar to that in Example 1 was used.
Production of a Fuel Composition A fixed-bed flow reactor was used. 1.3 g of the hydrotalcite catalyst was filled as a first stage catalyst to the upper part of a reaction tube of 10 mmφ internal diameter (SUS), and 1.0 g of the above-mentioned hydrogenation catalyst was filled as a second stage catalyst to the lower part of the reaction tube. A mixed gas of ethanol and hydrogen was introduced from above the reaction tube and the reaction products were analyzed. Ethanol gas was provided at 26 ml/min and hydrogen was provided at 100 ml/min. The reaction pressure was set at 1 atm.

For comparison purpose, a fuel composition was produced without conducting a hydrogenation reaction in the second step. 1.3 g of the hydrotalcite catalyst was filled in a reaction tube of 10 mmφ internal diameter (SUS). Ethanol gas (26 ml/min) was introduced with a carrier gas from above the reaction tube and the reaction product was analyzed.

Analysis results for the above samples are shown in Table 11.

TABLE 11

| | Test Example 3 First stage introduction | Comparative Example 3 |
|---|---|---|
| Reaction stages | 2-stage reaction | Single-stage reaction |
| Mixed quantity of hydrogen (ml/min.) | 200 | 0 |

TABLE 11-continued

| | Test Example 3 First stage introduction | Comparative Example 3 |
|---|---|---|
| First stage reaction temperature | 450 | 450 |
| Second stage reaction temperature | 190 | — |
| Pressure (Atmospheric temperature) | 1.0 | 1.0 |
| Components/wt % | | |
| Hydrocarbons | | |
| Paraffins | 39.1 | 0.5 |
| Olefins | 12.6 | 32.7 |
| Dienes | 0.3 | 7.0 |
| Aromatics | 0.3 | 0.7 |
| Others | 0.0 | 0.1 |
| (Subtotal) | 52.3 | 41.0 |
| Oxygenates | | |
| Ethanol | 6.7 | 5.5 |
| Other alcohols | 3.7 | 2.9 |
| Aldehydes | 0.4 | 5.9 |
| Ethers | 0.2 | 3.2 |
| Ketones | 1.8 | 5.3 |
| Others | 0.3 | 0.4 |
| (Subtotal) | 13.1 | 23.3 |
| Unidentified | 1.9 | 2.6 |
| Water | 34.5 | 32.0 |
| Total | 101.9 | 98.9 |

Similarly as when hydroxyapatite is used as a catalyst, dienes and aldehydes that are unfavorable as a fuel composition are reduced drastically but paraffins and alcohols that are favorable as a fuel composition are increased in the 2-stage reaction method conducted for the Test Example as compared to the single-stage reaction method conducted for Comparative Example.

Example 4

The reaction was conducted in a similar manner as in Example 3, except that a mixed catalyst of calcium oxide and magnesium phosphate ($CaO:Mg_3(PO_4)_2 \cdot 8H_2O = 1:1$) is used as an alcohol conversion catalyst. The analysis results obtained for samples are shown in Table 12.

TABLE 12

| | Test Example 4 First stage introduction | Comparative Example 4 |
|---|---|---|
| Reaction stages | 2-stage reaction | Single-stage reaction |
| Mixed quantity of hydrogen (ml/min.) | 200 | 0 |
| First stage reaction temperature | 550 | 550 |
| Second stage reaction temperature | 180 | — |
| Pressure (Atmospheric temperature) | 1.0 | 1.0 |
| Components/wt % | | |
| Hydrocarbons | | |
| Paraffins | 38.2 | 3.4 |
| Olefins | 9.4 | 21.1 |
| Dienes | 0.4 | 7.8 |
| Aromatics | 2.4 | 3.3 |
| Others | 0.0 | 0.3 |
| (Subtotal) | 50.3 | 36.0 |
| Oxygenates | | |
| Ethanol | 0.7 | 0.2 |
| Other alcohols | 6.8 | 0.3 |
| Aldehydes | 0.3 | 1.2 |
| Ethers | 0.2 | 0.5 |
| Ketones | 4.2 | 24.3 |
| Others | 1.5 | 1.9 |
| (Subtotal) | 13.7 | 28.4 |
| Unidentified | 2.3 | 2.9 |
| Water | 34.9 | 31.3 |
| Total | 101.2 | 98.6 |

Similarly as when hydroxyapatite is used as a catalyst, dienes and aldehydes that are unfavorable as a fuel composition are reduced drastically but paraffins and alcohols that are favorable as a fuel composition are increased in the 2-stage reaction method conducted for Test Examples as compared to the single-stage reaction method conducted for Comparative Examples.

Example 5

Catalyst

Alcohol Conversion Catalyst

As an alcohol conversion catalyst, HAP-1 catalyst (Ca/P molar ratio of 1.67), HAP-2 catalyst (Ca/P molar ratio of 1.62), and HAP-3 catalyst (Ca/P molar ratio of 1.52) that had been prepared according to a method similar to that in Example 1, were used.

Hydrogenation Catalyst

Raney Ni catalyst, Pd catalyst, and Raney Cu catalyst were used as a hydrogenation catalyst. A sponge nickel catalyst (NDT-90; Kawaken Fine Chemicals Co., Ltd.) was used as Raney Ni catalyst; a Pd carbon catalyst (N.E. Chemcat Corporation) was used as a Pd catalyst; and a sponge copper catalyst (CDT-60; Kawaken Fine Chemicals Co., Ltd.) was used as Raney Cu catalyst. Raney Ni catalyst and Raney Cu catalyst were diluted by 4 times with calcium phosphate ($\beta$-TCP) which is inactive to ethanol under the temperature range for hydrogenation reaction, in consideration of heat developed by a hydrogenation reaction. These catalytic powders were molded into pellets with a tablet compressor, which was then lightly ground to the mesh size of 14-26 for use.

Production of a Fuel Composition

All Reaction Products in the First Step

A fixed-bed flow reactor was used. 0.8 g of the HAP catalyst was filled in a reaction tube of 10 mm$\phi$ internal diameter (SUS). Gas, which had been diluted with helium so as to make the ethanol concentration of 20 vol %, was introduced into the reaction tube at 50 ml/min. Table 13 shows specific reaction conditions for Test Examples 5-1 to 5-7, and the compositions of all reaction products A-G.

TABLE 13

| Composition | A | B | C | D | E | F | G |
|---|---|---|---|---|---|---|---|
| Reaction conditions | | | | | | | |
| Name | 0.3 | 20 | 60 | 80 | 90-2 | 100 | 100-3 |
| (feature) | All products | All products | All products | All products | All products | All products | All products |
| catalyst | HAP-1 | HAP-1 | HAP-1 | HAP-1 | HAP-2 | HAP-1 | HAP-3 |
| catalyst weight/g | 0.80 | 0.80 | 0.80 | 0.80 | 0.80 | 0.80 | 0.80 |
| SV/h$^{-1}$ | 2000 | 2000 | 2000 | 2000 | 2000 | 2000 | 2000 |
| reaction temperature/° C. | 159 | 290 | 380 | 405 | 429 | 466 | 504 |
| Ethanol Coversion/% | 0.3 | 18.9 | 57.3 | 82.6 | 91.1 | 99.9 | 100.0 |
| Components/wt % | | | | | | | |
| Hydrocarbons | | | | | | | |
| Paraffins | 0.0 | 0.0 | 0.0 | 0.1 | 0.2 | 0.9 | 0.1 |
| Olefins | 0.0 | 0.0 | 0.8 | 2.3 | 29.6 | 15.9 | 60.3 |
| Dienes | 0.0 | 0.1 | 1.4 | 3.7 | 19.8 | 17.7 | 0.0 |
| Aromatics | 0.0 | 0.0 | 0.9 | 2.0 | 0.3 | 9.3 | 0.0 |
| Others | 0.0 | 0.0 | 0.5 | 0.8 | 0.7 | 2.6 | 0.0 |
| (Subtotal) | 0.0 | 0.1 | 3.6 | 8.8 | 50.6 | 46.3 | 60.4 |
| Oxygenates | | | | | | | |
| Ethanol | 99.7 | 81.1 | 42.7 | 17.4 | 8.9 | 0.1 | 0.0 |
| $C_4$-alcohol | 0.2 | 11.5 | 20.4 | 15.2 | 1.1 | 0.3 | 0.0 |
| $C_6$-alcohol | 0.0 | 2.0 | 8.5 | 10.2 | 0.1 | 0.5 | 0.0 |
| $C_8$-alcohol | 0.0 | 0.2 | 2.9 | 5.4 | 0.0 | 0.5 | 0.0 |
| $C_{10}$-alcohol | 0.0 | 0.0 | 1.2 | 3.3 | 0.0 | 0.2 | 0.0 |
| $C_{12}$-alcohols | 0.0 | 0.0 | 0.4 | 3.0 | 0.0 | 0.2 | 0.0 |
| Other alcohols | 0.0 | 0.1 | 0.1 | 0.1 | 0.1 | 0.1 | 0.0 |
| Aldehydes | 0.0 | 0.4 | 2.4 | 4.0 | 1.7 | 3.9 | 0.7 |
| Ethers | 0.0 | 0.0 | 0.2 | 0.3 | 2.2 | 0.6 | 0.0 |

TABLE 13-continued

| Composition | A | B | C | D | E | F | G |
|---|---|---|---|---|---|---|---|
| Ketones | 0.0 | 0.0 | 0.1 | 0.2 | 0.1 | 1.2 | 0.0 |
| Acid | 0.0 | 0.0 | 0.0 | 0.0 | 0.0 | 0.0 | 0.0 |
| Ester | 0.0 | 0.0 | 0.0 | 0.0 | 0.0 | 0.0 | 0.0 |
| Others | 0.0 | 0.0 | 0.0 | 0.0 | 0.0 | 0.0 | 0.0 |
| (Subtotal) | 99.9 | 95.5 | 78.9 | 59.3 | 14.1 | 7.7 | 0.8 |
| Unidentified | 0.0 | 0.4 | 2.7 | 7.4 | 0.4 | 7.3 | 0.0 |
| Water | 0.1 | 4.0 | 14.5 | 24.2 | 34.1 | 37.4 | 38.8 |
| Total removed component/wt % | 100.0 | 100.0 | 99.8 | 99.6 | 99.2 | 98.7 | 100.0 |
| Off-gas | | | | | | | |
| Methane | | | | | | | |
| Ethane | | | | | | | |
| Ethylene | | | | | | | |
| Propylene | | | | | | | |
| Butenes | | | | | | | |
| 1,3-Butadiene | | | | | | | |
| Ethanol | | | | | | | |
| Water | | | | | | | |
| Total | | | | | | | |

All Liquid Reaction Products in the First Step

All reaction products A-G in the first step were respectively introduced into a cold trap of 10° C. at normal pressure, and all liquid reaction products H-N in the first step were prepared by liquefaction. Table 14 shows specific conditions for Test Examples 5-8 to 5-14 and the composition rates of all liquid phase reaction products H-N.

TABLE 14

| Composition | H | I | J | K | L | M | N |
|---|---|---|---|---|---|---|---|
| Reaction conditions | | | | | | | |
| Name (feature) | 0.3A removed off-gas | 20A removed off-gas | 60A removed off-gas | 80A removed off-gas | 90-2A removed off-gas | 100A removed off-gas | 100-3A removed off-gas |
| catalyst | HAP-1 | HAP-1 | HAP-1 | HAP-1 | HAP-2 | HAP-1 | HAP-3 |
| catalyst weight/g | 0.80 | 0.80 | 0.80 | 0.80 | 0.80 | 0.80 | 0.80 |
| $SV/h^{-1}$ | 2000 | 2000 | 2000 | 2000 | 2000 | 2000 | 2000 |
| reaction temperature/° C. | 159 | 290 | 380 | 405 | 429 | 466 | 504 |
| Ethanol Conversion/% | 0.3 | 18.9 | 57.3 | 82.6 | 91.1 | 99.9 | 100.0 |
| Components/wt % | | | | | | | |
| Hydrocarbons | | | | | | | |
| Paraffins | 0.0 | 0.0 | 0.0 | 0.0 | 0.0 | 0.0 | 0.0 |
| Olefins | 0.0 | 0.0 | 0.3 | 1.1 | 1.9 | 9.0 | 0.0 |
| Dienes | 0.0 | 0.0 | 0.7 | 2.3 | 7.2 | 11.9 | 0.0 |
| Aromatics | 0.0 | 0.0 | 0.9 | 2.0 | 0.3 | 9.3 | 0.0 |
| Others | 0.0 | 0.0 | 0.5 | 0.8 | 0.7 | 2.6 | 0.0 |
| (Subtotal) | 0.0 | 0.1 | 2.4 | 6.2 | 10.1 | 32.7 | 0.0 |
| Oxygenates | | | | | | | |
| Ethanol | 99.1 | 80.6 | 42.4 | 17.2 | 8.8 | 0.1 | 0.0 |
| $C_4$-alcohol | 0.2 | 11.4 | 20.2 | 15.1 | 1.1 | 0.3 | 0.0 |
| $C_6$-alcohol | 0.0 | 2.0 | 8.5 | 10.1 | 0.1 | 0.5 | 0.0 |
| $C_8$-alcohol | 0.0 | 0.2 | 2.9 | 5.4 | 0.0 | 0.5 | 0.0 |
| $C_{10}$-alcohol | 0.0 | 0.0 | 1.2 | 3.3 | 0.0 | 0.2 | 0.0 |
| $C_{12}$-alcohols | 0.0 | 0.0 | 0.4 | 3.0 | 0.0 | 0.2 | 0.0 |
| Other alcohols | 0.0 | 0.1 | 0.1 | 0.1 | 0.1 | 0.1 | 0.0 |
| Aldehydes | 0.0 | 0.4 | 2.4 | 4.0 | 1.7 | 3.9 | 0.7 |
| Ethers | 0.0 | 0.0 | 0.2 | 0.3 | 2.2 | 0.6 | 0.0 |
| Ketones | 0.0 | 0.0 | 0.1 | 0.2 | 0.1 | 1.2 | 0.0 |
| Acid | 0.0 | 0.0 | 0.0 | 0.0 | 0.0 | 0.0 | 0.0 |
| Ester | 0.0 | 0.0 | 0.0 | 0.0 | 0.0 | 0.0 | 0.0 |
| Others | 0.0 | 0.0 | 0.0 | 0.0 | 0.0 | 0.0 | 0.0 |
| (Subtotal) | 99.3 | 94.8 | 78.4 | 58.8 | 14.0 | 7.7 | 0.8 |
| Unidentified | 0.0 | 0.4 | 2.7 | 7.4 | 0.4 | 7.3 | 0.0 |
| Water | 0.1 | 4.0 | 14.5 | 24.2 | 34.1 | 37.4 | 38.8 |
| Total | 99.4 | 99.3 | 98.0 | 96.6 | 58.6 | 85.2 | 39.6 |

TABLE 14-continued

| Composition | H | I | J | K | L | M | N |
|---|---|---|---|---|---|---|---|
| removed component/wt % Off-gas | | | | | | | |
| Methane | 0.0 | 0.0 | 0.0 | 0.0 | 0.0 | 0.3 | 0.0 |
| Ethane | 0.0 | 0.0 | 0.0 | 0.1 | 0.2 | 0.6 | 0.1 |
| Ethylene | 0.0 | 0.0 | 0.4 | 0.7 | 23.7 | 3.3 | 60.3 |
| Propylene | 0.0 | 0.0 | 0.1 | 0.2 | 0.5 | 1.5 | 0.0 |
| Butenes | 0.0 | 0.0 | 0.1 | 0.3 | 1.2 | 2.1 | 0.0 |
| 1,3-Butadiene | 0.0 | 0.0 | 0.6 | 1.3 | 4.2 | 5.8 | 0.0 |
| Ethanol | 0.6 | 0.5 | 0.3 | 0.2 | 0.1 | 0.0 | 0.0 |
| Water | | | | | | | |
| Total | 0.6 | 0.5 | 1.5 | 2.8 | 29.8 | 13.5 | 60.4 |

Liquid Phase Dehydration Reaction Products in the First Step

All liquid phase reaction products I-N in the first step were respectively passed through a distillation column, from which liquid phase dehydration products O-T in the first step were prepared by removing most of the unreacted ethanol and product water. Table 15 shows specific conditions for Test Examples 5-15 to 5-20 and the composition rates of all liquid phase reaction products O-T.

TABLE 15

| Composition | O | P | Q | R | S | T |
|---|---|---|---|---|---|---|
| Reaction conditions | | | | | | |
| Name (feature) | 20B removed off-gas ethanol and water | 60B removed off-gas ethanol and water | 80B removed off-gas ethanol and water | 90-2B removed off-gas | 100B removed off-gas ethanol and water | 100-3B removed off-gas ethanol and water |
| catalyst | HAP-1 | HAP-1 | HAP-1 | HAP-2 | HAP-1 | HAP-3 |
| catalyst weight/g | 0.80 | 0.80 | 0.80 | 0.80 | 0.80 | 0.80 |
| SV/h$^{-1}$ | 2000 | 2000 | 2000 | 2000 | 2000 | 2000 |
| reaction temperature/° C. | 290 | 380 | 405 | 429 | 466 | 504 |
| Ethanol Coversion/% | 18.9 | 57.3 | 82.6 | 91.1 | 99.9 | 100.0 |
| Components/wt % Hydrocarbons | | | | | | |
| Paraffins | 0.0 | 0.0 | 0.0 | 0.0 | 0.0 | 0.0 |
| Olefins | 0.0 | 0.2 | 1.0 | 0.7 | 8.3 | 0.0 |
| Dienes | 0.0 | 0.5 | 1.9 | 3.0 | 10.0 | 0.0 |
| Aromatics | 0.0 | 0.9 | 2.0 | 0.3 | 9.3 | 0.0 |
| Others | 0.0 | 0.5 | 0.8 | 0.7 | 2.6 | 0.0 |
| (Subtotal) | 0.1 | 2.1 | 5.6 | 4.7 | 30.1 | 0.0 |
| Oxygenates | | | | | | |
| Ethanol | 1.2 | 1.0 | 0.4 | 0.2 | 0.0 | 0.0 |
| $C_4$-alcohol | 11.2 | 20.1 | 15.0 | 1.1 | 0.3 | 0.0 |
| $C_6$-alcohol | 2.0 | 8.5 | 10.2 | 0.1 | 0.5 | 0.0 |
| $C_8$-alcohol | 0.2 | 2.9 | 5.4 | 0.0 | 0.5 | 0.0 |
| $C_{10}$-alcohol | 0.0 | 1.2 | 3.3 | 0.0 | 0.2 | 0.0 |
| $C_{12}$-alcohols | 0.0 | 0.4 | 3.0 | 0.0 | 0.2 | 0.0 |
| Other alcohols | 0.1 | 0.1 | 0.1 | 0.1 | 0.1 | 0.0 |
| Aldehydes | 0.4 | 2.4 | 4.0 | 1.7 | 3.9 | 0.7 |
| Ethers | 0.0 | 0.2 | 0.3 | 2.2 | 0.6 | 0.0 |
| Ketones | 0.0 | 0.1 | 0.2 | 0.1 | 1.2 | 0.0 |
| Acid | 0.0 | 0.0 | 0.0 | 0.0 | 0.0 | 0.0 |
| Ester | 0.0 | 0.0 | 0.0 | 0.0 | 0.0 | 0.0 |
| Others | 0.0 | 0.0 | 0.0 | 0.0 | 0.0 | 0.0 |
| (Subtotal) | 15.2 | 36.9 | 42.1 | 5.4 | 7.6 | 0.8 |
| Unidentified | 0.4 | 2.7 | 7.4 | 0.4 | 7.3 | 0.0 |
| Water | 0.2 | 0.3 | 0.3 | 0.4 | 0.4 | 0.0 |
| Total | 15.9 | 42.1 | 55.4 | 10.9 | 45.4 | 0.8 |
| removed component/wt % Off-gas | | | | | | |
| Methane | 0.0 | 0.0 | 0.0 | 0.0 | 0.3 | 0.0 |
| Ethane | 0.0 | 0.0 | 0.1 | 0.2 | 0.6 | 0.1 |
| Ethylene | 0.0 | 0.4 | 0.7 | 23.7 | 3.3 | 60.3 |
| Propylene | 0.0 | 0.1 | 0.2 | 0.5 | 1.5 | 0.0 |
| Butenes | 0.0 | 0.2 | 0.4 | 4.7 | 2.7 | 0.0 |
| 1,3-Butadiene | 0.0 | 0.9 | 1.8 | 16.8 | 7.8 | 0.0 |

TABLE 15-continued

| Composition | O | P | Q | R | S | T |
|---|---|---|---|---|---|---|
| Ethanol | 79.4 | 41.4 | 16.8 | 8.6 | 0.1 | 0.0 |
| Water | 3.8 | 14.2 | 23.9 | 33.7 | 37.0 | 38.8 |
| Total | 83.3 | 57.1 | 43.8 | 88.2 | 53.3 | 99.2 |

Hydrogenation Reaction in the Second Step

Compositions of interest that contain alkanes were obtained by conducting hydrogenation reaction by using all reaction products in the first step (B, C, D, F, G), all liquid phase reaction products in the first step (I, J, K, M), and liquid phase dehydration reaction products in the first step (O, P, Q, S) as a respective material, and by using Raney Ni, Pd or Raney Cu as a catalyst. A fixed-bed flow reactor was used for the reactions.

When using all reaction products in the first step (B, C, D, F, G) as a material, a reactor for the second step was set in the latter part of the reactor for the first step, and Raney Ni, Pd or Raney Cu was filled in a quartz reaction tube of 5 mmϕ inner diameter and used as a second step catalyst. Hydrogen gas was supplied at 50 ml/min from above the reaction tube and mixed with gas which had passed through the first step reactor, the mixed gas was then introduced into the reaction tube. Compositions produced by a hydrogenation reaction were analyzed. When all liquid phase reaction products in the first step (I, J, K, M) and liquid phase dehydration reaction products in the first step (O, P, Q, S) were used as materials, Raney Ni, Pd or Raney Cu was filled in a reaction tube of 10 mmϕ inner diameter (SUS) to be used as a second step catalyst. All liquid phase reaction products in the first step (I, J, K, M) and liquid phase dehydration reaction products in the first step (O, P, Q, S) were respectively gasified by a carbureter, and hydrogen gas and helium carrier gas were added at 50 ml/min and 40 ml/min, respectively. Compositions produced by a hydrogenation reaction were analyzed. Table 16 shows specific conditions and the composition rates of compositions produced by a hydrogenation reaction in the second step. Further, in the hydrogenation reaction test for light gas, a different reactor for the second step was set wherein Raney Ni or Raney Cu was filled in a quartz reaction tube of 5 mmϕ internal diameter as a second step catalyst. Hydrogen gas was then supplied from above the reaction tube at 50 ml/min, and light gas generated in the first step (J-off-gas, K-off-gas, L-off-gas, M-off-gas, N-off-gas) was subjected to a hydrogenation reaction. Thus generated compositions were analyzed. Table 17 shows specific reaction conditions and the composition rates of compositions generated in a hydrogenation reaction in the second step.

TABLE 16

| Composition | B | C | D | F | G | I | J | K | M | O | P | Q | S |
|---|---|---|---|---|---|---|---|---|---|---|---|---|---|
| Material | 20 | 60 | 80 | 100 | 100-3 | 20A | 60A | 80A | 100A | 20B | 60B | 80B | 100B |
| Reaction Condition | | | | | | | | | | | | | |
| Catalyst | Raney Ni | Pd | Raney Cu | Raney Ni | Raney Ni | Raney Ni | Pd | Raney Cu | Raney Ni | Raney Ni | Pd | Raney Cu | Raney Ni |
| Catalyst weight/g | 0.3 | 0.4 | 4.0 | 2.0 | 2.0 | 0.3 | 0.4 | 4.0 | 2.0 | 0.3 | 0.4 | 4.0 | 2.0 |
| SV/h$^{-1}$ | 10000 | 6000 | 800 | 1500 | 1500 | 10000 | 6000 | 800 | 1500 | 10000 | 6000 | 800 | 1500 |
| Temperature/° C. | 220 | 200 | 160 | 185 | 170 | 220 | 200 | 160 | 185 | 220 | 200 | 160 | 185 |
| Component yield/wt % | | | | | | | | | | | | | |
| Hydrocarbons | | | | | | | | | | | | | |
| Methane | 0.1 | 0.2 | 0.9 | 2.5 | 1.3 | 0.0 | 0.1 | 0.8 | 1.9 | 0.1 | 0.2 | 0.3 | 1.3 |
| Ethane | 0.2 | 0.7 | 1.2 | 6.6 | 62.2 | 0.1 | 0.2 | 0.5 | 2.2 | 0.1 | 0.3 | 0.4 | 1.4 |
| Butanes | 0.1 | 0.9 | 2.6 | 7.6 | 0.1 | 0.1 | 0.3 | 0.9 | 2.4 | 0.0 | 0.1 | 1.0 | 1.9 |
| C6-parafins | 0.0 | 0.9 | 2.3 | 10.3 | 0.0 | 0.0 | 1.0 | 2.3 | 12.2 | 0.0 | 0.8 | 2.6 | 13.3 |
| C8-parafins | 0.0 | 0.3 | 1.8 | 4.5 | 0.0 | 0.0 | 0.4 | 1.7 | 5.5 | 0.0 | 0.3 | 1.0 | 6.5 |
| C10-parafins | 0.0 | 0.1 | 0.3 | 1.6 | 0.0 | 0.0 | 0.2 | 0.2 | 1.6 | 0.0 | 0.1 | 0.1 | 1.7 |
| Other parafins | 0.0 | 0.2 | 0.7 | 4.2 | 0.4 | 0.0 | 0.1 | 0.4 | 3.2 | 0.0 | 0.1 | 0.3 | 3.1 |
| Parafins | 0.5 | 3.2 | 9.8 | 37.2 | 64.0 | 0.3 | 2.3 | 6.8 | 28.9 | 0.2 | 1.7 | 5.6 | 29.2 |
| Olefins | 0.0 | 0.1 | 0.5 | 6.3 | 0.7 | 0.0 | 0.0 | 0.1 | 1.6 | 0.0 | 0.0 | 0.2 | 1.3 |
| Dienes | 0.0 | 0.0 | 0.0 | 2.1 | 0.0 | 0.0 | 0.0 | 0.0 | 0.7 | 0.0 | 0.0 | 0.0 | 0.4 |
| Aromatics | 0.0 | 0.4 | 0.7 | 6.0 | 0.0 | 0.0 | 0.2 | 0.7 | 3.5 | 0.0 | 0.4 | 0.5 | 2.4 |
| Others | 0.0 | 0.0 | 0.0 | 1.2 | 0.0 | 0.0 | 0.0 | 0.0 | 0.8 | 0.0 | 0.0 | 0.0 | 0.2 |
| (Subtotal) | 0.5 | 3.7 | 11.0 | 52.7 | 64.7 | 0.3 | 2.6 | 7.7 | 35.5 | 0.2 | 2.1 | 6.2 | 33.5 |
| Oxygenates | | | | | | | | | | | | | |
| Ethanol | 81.3 | 43.7 | 17.0 | 0.7 | 0.8 | 81.3 | 43.5 | 17.2 | 0.7 | 0.3 | 1.0 | 1.2 | 0.4 |
| Other alcohols | 14.0 | 34.7 | 40.1 | 2.3 | 0.0 | 14.0 | 34.7 | 40.4 | 5.6 | 14.0 | 34.7 | 40.0 | 5.5 |
| Aldehydes | 0.1 | 0.2 | 0.4 | 0.1 | 0.0 | 0.1 | 0.1 | 0.2 | 0.1 | 0.1 | 0.1 | 0.1 | 0.0 |
| Ethers | 0.0 | 0.2 | 0.1 | 0.2 | 0.0 | 0.0 | 0.2 | 0.1 | 0.4 | 0.0 | 0.2 | 0.3 | 0.6 |
| Ketones | 0.0 | 0.0 | 0.1 | 0.4 | 0.0 | 0.0 | 0.0 | 0.0 | 0.3 | 0.0 | 0.0 | 0.0 | 0.1 |
| Acid | 0.0 | 0.0 | 0.0 | 0.0 | 0.0 | 0.0 | 0.0 | 0.0 | 0.0 | 0.0 | 0.0 | 0.0 | 0.0 |

TABLE 16-continued

| Composition | B | C | D | F | G | I | J | K | M | O | P | Q | S |
|---|---|---|---|---|---|---|---|---|---|---|---|---|---|
| Ester | 0.0 | 0.0 | 0.0 | 0.0 | 0.0 | 0.0 | 0.0 | 0.0 | 0.0 | 0.0 | 0.0 | 0.0 | 0.0 |
| Others | 0.0 | 0.0 | 0.0 | 0.0 | 0.0 | 0.0 | 0.0 | 0.0 | 0.0 | 0.0 | 0.0 | 0.0 | 0.0 |
| (Subtotal) | 95.5 | 78.8 | 57.7 | 3.7 | 0.8 | 95.5 | 78.6 | 57.9 | 7.1 | 14.4 | 36.0 | 41.6 | 6.6 |
| Unidentified | 0.1 | 3.0 | 6.8 | 6.5 | 0.1 | 0.2 | 2.8 | 7.3 | 6.6 | 0.2 | 2.9 | 7.5 | 6.4 |
| Water | 4.3 | 14.8 | 25.6 | 41.4 | 39.4 | 4.2 | 14.7 | 25.4 | 40.5 | 0.1 | 0.3 | 0.7 | 2.6 |
| Total | 100.3 | 100.3 | 101.1 | 104.2 | 104.9 | 100.1 | 98.7 | 98.3 | 89.8 | 15.0 | 41.3 | 56.0 | 49.1 |

TABLE 17

| Composition | J-off-gas | K-off-gas | L-off-gas | M-off-gas | N-off-gas |
|---|---|---|---|---|---|
| Material Reaction Condition | 60A-off-gas | 80A-off-gas | 90-2A-off-gas | 100A-off-gas | 100-3A-off-gas |
| Catalyst | Raney Cu | Raney Cu | Raney Cu | Raney Ni | Raney Ni |
| Catalyst weight/g | 4.0 | 4.0 | 4.0 | 2.0 | 2.0 |
| SV/h$^{-1}$ | 800 | 800 | 800 | 1500 | 1500 |
| Temperature/° C. | 160 | 160 | 160 | 185 | 185 |
| Component yield/wt % Hydrocarbons | | | | | |
| Methane | 0.0 | 0.0 | 0.0 | 0.3 | 0.0 |
| Ethane | 0.4 | 0.7 | 25.4 | 3.9 | 64.2 |
| Propane | 0.1 | 0.2 | 0.3 | 1.4 | 0.0 |
| Butanes | 0.7 | 1.5 | 5.2 | 7.7 | 0.0 |
| Paraffins | 1.2 | 2.4 | 30.8 | 13.4 | 64.2 |
| Olefins | 0.0 | 0.2 | 0.3 | 0.2 | 0.5 |
| Dienes | 0.1 | 0.1 | 0.4 | 0.5 | 0.0 |
| (Subtotal) | 1.3 | 2.7 | 31.5 | 14.1 | 64.7 |
| Oxygenates | | | | | |
| Ethanol | 0.3 | 0.2 | 0.1 | 0.0 | 0.0 |
| Total | 1.6 | 2.9 | 31.6 | 14.1 | 64.7 |

INDUSTRIAL APPLICABILITY

The method for producing compositions of the present invention enables production of compositions comprising alkanes or alcohols, that are useful as a chemical industrial material or a fuel composition, by using alcohols such as ethanol as a material. Especially, it enables to produce a fuel composition for the internal combustion engine which has a remarkably improved oxidative stability, a suppressed gum formation and a high calorific value. In addition, alcohols such as butanol, hexanol and octanol can be obtained at a high yield.

The invention claimed is:

1. A method for producing a composition using an alcohol as a starting material, the composition comprising at least one component selected from the group consisting of paraffins and alcohols, wherein the method comprises a first step to allow the starting material alcohol to contact with an alcohol conversion catalyst, wherein the alcohol conversion catalyst is a phosphate or a clay mineral, and a second step to subject a product obtained in the first step to a hydrogenation reaction; and optionally, subjecting the products from the first step to a separation method as part of the first step prior to the second step;

wherein the second step is conducted with a hydrogenation catalyst, or at 1-200 atm, or at 0-400° C.

2. The method for producing a composition according to claim 1, wherein the phosphate is hydroxyapatite.

3. The method for producing a composition according to claim 1, wherein the clay mineral is hydrotalcite.

4. The method for producing a composition according to claim 1, wherein the first step reaction is conducted at 1-200 atm.

5. The method for producing a composition according to claim 1, wherein the first step reaction is conducted at 100-600° C.

6. The method for producing a composition according to claim 1, wherein the first step reaction is conducted for 0.1-600 seconds.

7. The method for producing a composition according to claim 1, wherein hydrogen is used as a carrier gas for the starting material alcohol in the first step reaction.

8. The method for producing a composition according to claim 1, wherein one of the following is used as the product obtained in the first step: all reaction products consisting of a liquid phase including alcohols, water, hydrocarbons of 4-12 carbons, and a gas phase which is a light gas containing paraffins, alcohols, olefins; all liquid phase reaction products consisting of all reaction products from which light gas has been removed; a liquid phase dehydration reaction product, wherein the starting material alcohol is ethanol, consisting of all reaction products from which light gas, unreacted ethanol and product water have been removed; and light gas.

9. The method for producing a composition according to claim 8, wherein all reaction products in the first step respectively comprise paraffins at 0-1.7 wt %, olefins at 0-60.3 wt %, dienes at 0-19.8 wt %, aromatics at 0-11.4 wt %, alcohols at 0-37.4 wt %, aldehydes at 0-5.4 wt %, ethers at 0-2.2 wt %, and product water at 0.1-38.8 wt % relative to the starting material alcohol, wherein the alcohol is ethanol.

10. The method for producing a composition according to claim 8, wherein alcohols in the liquid phase converted from the starting material alcohol, wherein the starting material alcohol is ethanol, in the first step comprise at least one of butanol, hexanol and octanol.

11. The method for producing a composition according to claim 1, wherein hydrogen is used as a carrier gas for the starting material alcohol in the first step, and the hydrogen as a carrier gas is used in the hydrogenation reaction in the second step.

12. The method for producing a composition according to claim 1, wherein hydrogen generated in the first step is used in the hydrogenation reaction in the second step.

13. A composition obtained by a production method according to claim 1.

14. A composition obtained by a production method according to claim 13, wherein the hydrogenation reaction is conducted for all reaction products obtained in the first step consisting of a liquid phase including alcohols, water, hydrocarbons of 4-12 carbons, and a gas phase which is a light gas containing paraffins, alcohols, and olefins.

15. The composition according to claim 14, containing paraffins at 0.5-64.0 wt %, olefins at 0-6.3 wt %, dienes at 0-2.1 wt % and aldehydes at 0.1-0.4 wt % relative to the starting material alcohol, wherein the alcohol is ethanol.

16. The composition according to claim 15, containing C1 paraffins at 0.1-2.5 wt %, C2 paraffins at 0.2-62.2 wt %, C4 paraffins at 0.1-7.6 wt %, C6 paraffins at 0-10.3 wt % and C8 paraffins at 0-4.5 wt % relative to the starting material ethanol.

17. A composition obtained by a production method according to claim 13, wherein the hydrogenation reaction is conducted for all liquid phase reaction products consisting of all reaction products obtained in the first step from which light gas has been removed.

18. The composition according to claim 17, containing paraffins at 0.3-28.9 wt %, olefins at 0-1.6 wt %, dienes at 0-0.7 wt % and aldehydes at 0.1-0.2 wt % relative to the starting material alcohol, wherein the alcohol is ethanol.

19. The composition according to claim 18, containing C1 paraffins at 0-1.9 wt %, C2 paraffins at 0.1-2.2 wt %, C4 paraffins at 0.1-2.4 wt %, C6 paraffins at 0-12.2 wt % and C8 paraffins at 0-5.5 wt % relative to the starting material ethanol.

20. A composition obtained by a production method according to claim 13, wherein the hydrogenation reaction is conducted for a liquid phase dehydration reaction product consisting of all reaction products obtained in the first step from which light gas, unreacted ethanol and product water have been removed.

21. The composition according to claim 20, containing paraffins at 0.2-29.2 wt %, olefins at 0-1.3 wt %, dienes at 0-0.4 wt % and aldehydes at 0-0.1 wt % relative to the starting material alcohol, wherein the alcohol is ethanol.

22. The composition according to claim 21, containing C1 paraffins at 0.1-1.3 wt %, C2 paraffins at 0.1-1.4 wt %, C4 paraffins at 0-1.9 wt %, C6 paraffins at 0-13.3 wt % and C8 paraffins at 0-6.5 wt % relative to the starting material ethanol.

23. A composition obtained by the production method according to claim 13, wherein the hydrogenation reaction is conducted for using a light gas product obtained in the first step.

24. The composition according to claim 23, containing paraffins at 1.2-64.2 wt %, olefins at 0-0.5 wt %, and dienes at 0-0.5 wt % relative to the starting material alcohol, wherein the alcohol is ethanol.

25. The composition according to claim 24, containing C1 paraffin at 0-0.3 wt %, C2 paraffin at 0.4-64.2 wt %, and C4 paraffin at 0-7.7 wt % relative to the starting material ethanol.

26. The composition according to claim 13, containing olefins at 0-10.0 wt % relative to the starting material alcohol, wherein the alcohol is ethanol.

27. The composition according to claim 13, containing dienes at 0-3.0 wt % relative to the starting material alcohol, wherein the alcohol is ethanol.

28. The composition according to claim 13, containing aldehydes at 0-1.0 wt % relative to the starting material alcohol, wherein the alcohol is ethanol.

29. The composition according to claim 13, containing paraffins at 0.2-70.0 wt % relative to the starting material alcohol, wherein the alcohol is ethanol.

30. The composition according to claim 13, containing alcohols at 0-50.0 wt % relative to the starting material alcohol, wherein the alcohol is ethanol.

31. A fuel composition for an internal combustion engine with improved fuel oxidation stability, comprising a composition according to claim 13, wherein the olefin and diene contents are decreased and the paraffin content is increased.

32. A fuel composition for an internal combustion engine with improved fuel oxidation stability, comprising a composition according to claim 13, wherein the composition comprises aldehyde, and the aldehyde content is decreased and the alcohol content is increased.

33. A fuel composition for an internal combustion engine, comprising a composition according to claim 13, wherein a gum is formed during the production method and the gum content is lower than the level of JIS standard due to a hydrogenation reaction in the second step.

34. The method for producing a composition according to claim 1, wherein the starting material alcohol is ethanol.

35. The method for producing a composition according to claim 1, wherein the alcohol conversion catalyst concurrently causes dehydration and dehydrogenation of alcohol.

36. The method for producing a composition according to claim 1, wherein the conversion rate of the starting material alcohol in the first step is 0.3% to 100%.

37. The method for producing a composition according to claim 1, wherein the second step is a step conducting a hydrogenation reaction of one of the following: all reaction products obtained in the first step; all liquid phase reaction products consisting of all reaction products obtained in the first step from which light gas has been removed; liquid phase dehydration reaction products consisting of all reaction products obtained in the first step, wherein the starting material alcohol is ethanol, from which light gas, unreacted ethanol, and product water have been removed; and light gas obtained from the first step.

38. A method for producing a composition using an alcohol as a starting material, the composition comprising at least one component selected from the group consisting of paraffins and alcohols, wherein the method comprises a first step to allow the starting material alcohol to contact with an alcohol conversion catalyst, wherein the alcohol conversion catalyst is a phosphate or hydrotalcite, and a second step to subject a product obtained in the first step to a hydrogenation reaction.

* * * * *

UNITED STATES PATENT AND TRADEMARK OFFICE
CERTIFICATE OF CORRECTION

| | |
|---|---|
| PATENT NO. | : 8,187,347 B2 |
| APPLICATION NO. | : 12/246386 |
| DATED | : May 29, 2012 |
| INVENTOR(S) | : Sakuma et al. |

Page 1 of 1

It is certified that error appears in the above-identified patent and that said Letters Patent is hereby corrected as shown below:

Column 37, line 3, in claim 23, "conducted for using" should read:

--conducted using--.

Signed and Sealed this
Twenty-third Day of October, 2012

David J. Kappos
*Director of the United States Patent and Trademark Office*